US012807060B2

(12) United States Patent
Mollick

(10) Patent No.: US 12,807,060 B2
(45) Date of Patent: Nov. 24, 2026

(54) LEVER AND RATCHET HYBRID LOAD BINDER

(71) Applicant: Peter Joseph Mollick, Phoenix, AZ (US)

(72) Inventor: Peter Joseph Mollick, Phoenix, AZ (US)

( * ) Notice: Subject to any disclaimer, the term of this patent is extended or adjusted under 35 U.S.C. 154(b) by 575 days.

(21) Appl. No.: 18/218,571

(22) Filed: Jul. 5, 2023

(65) Prior Publication Data

US 2024/0001837 A1 Jan. 4, 2024

Related U.S. Application Data

(60) Provisional application No. 63/358,213, filed on Jul. 4, 2022.

(51) Int. Cl.
*B60P 7/08* (2006.01)
*F16G 11/12* (2006.01)

(52) U.S. Cl.
CPC ............. *B60P 7/083* (2013.01); *B60P 7/0838* (2013.01); *F16G 11/12* (2013.01)

(58) Field of Classification Search
CPC .......... B60P 7/083; B60P 7/0838; F16G 11/12
See application file for complete search history.

(56) References Cited

U.S. PATENT DOCUMENTS 2,359,492 A * 10/1944 Rockwood ............. F16G 11/10 403/43
2,824,717 A * 2/1958 Yeager .................... F16G 11/12 24/270
3,418,008 A * 12/1968 Durbin .................. B60P 7/0838 24/270
4,423,639 A * 1/1984 Grade ....................... G01L 5/08 254/257
4,500,073 A * 2/1985 Smith ..................... F16G 15/00 254/258

(Continued)

FOREIGN PATENT DOCUMENTS

CA 2156939 A1 * 2/1997 ............ B60P 7/0838

*Primary Examiner* — Daniel J Colilla

(57) ABSTRACT

The invention combines two types of tension load-binders normally used with chains to secure a load to the deck of a truck or trailer. The combination of the two types of load-binds forms a hybrid-load-binder. One of the load-binders is a lever-load-binder and the other is a ratchet-load-binder. A modification is made to the lever-load-binder to allow the handle of the lever-load-binder to be locked in the closed position when substantial tension is applied pulling on the two hooks of the hybrid-load-binder. Although, the lever-load-binder cannot release the hybrid-load-binder form the substantial tension pulling on the hooks, the ratchet-binder is able to release the tension pulling on the hooks by rotating the handle of the ratchet-load-binder in the loosening direction. The modification to the lever-load-binder makes the lever-load-binder useless if used independently from the ratchet-load-binder. The modification to the lever-load-binder results in the lever-load-binder not being able to independently apply substantial tension on a binding chain to secure a load on a truck or trailer deck, although, the lever-load-binder and the ratchet-load-binder work in combination for a faster and more secure binding of a load.

21 Claims, 10 Drawing Sheets

(56) References Cited

U.S. PATENT DOCUMENTS

| | | | | |
|---|---|---|---|---|
| 7,913,363 | B2 | 3/2011 | Scott | |
| 11,440,458 | B2 | 9/2022 | Mollick | |
| 2006/0005360 | A1 * | 1/2006 | Profit | B25B 25/00 24/71 R |
| 2021/0122287 | A1 * | 4/2021 | Mollick | F16G 11/12 |

* cited by examiner

LEVER AND RATCHET HYBRID LOAD BINDER

CROSS-REFERENCE TO RELATED APPLICATIONS

This application claims the benefit or U.S. Provisional application No. 63/358,213 titles "Hybrid Chain Load Binder" filed Jul. 4, 2022, the contents of which are incorporated herein in their entirety.

BACKGROUND OF THE INVENTION

1. Field of the Invention

The invention relates to two different styles of a mechanical device used to bind and secure a load usually for transportation on a truck or trailer deck, particularly cargo such as equipment or merchandise that would normally shift during transport when not secured in place. The mechanical device being either a ratchet-load-binder or a lever-load-binder used normally in conjunction with a chain. Each load securing chain is usually attached to one load binder.

2. Description of Related Art

Ratchet-load-binders and lever-load-binders serve the purpose of binding a chain on the load, the chain holding the load in place during transportation or for the general securing of the load. The load can be material such as construction materials, or in many cases the load is machinery and equipment. Load securing chains are generally used in place of load securing straps when the weight of the load is great or especially used when a high weighted load has the ability to roll, such as an agricultural tractor. Chains generally have a higher weight supporting capacity than straps. In some situations, the load may be directly connected to the load binder with hooks or other means mounted to the load and also mounted to the truck deck eliminating the need for straps or chains. Usually, at least two and many times more than two load-binders in combination with chains are used to secure a single load. When using a load binder with attached hooks for attaching to a chain link, only one end of the chain requires a hook, the hook on the load binder can attach to the chain, negating the need for a second hook on the chain. The hook on the chain can attach to the trailer deck or the load to be transported.

Although there are a few different ways to secure a load with a load binder and chains, a common method is attaching the load binder to separate chains at each end of the load binder, then securing one of the chains to the truck deck and the other chain to the load or over the load and to the opposing side of the truck deck. In the alternative, one chain can be attached to the ratchet-load-binder or the lever-load-binder and then attach the other side of the binder directly to a truck deck eyelet, then securing the chain to the load or over the load and attaching to the opposing side of the truck deck at another eyelet. These two above stated chain securing methods prevents any part of the chain from being positioned along side of the load binder, allowing a full rotational motion of the load binder handle operation with no interference from the chain blocking the rotation of the handle. Chain load securing methods that align the chain along side of the load binder can sometimes be difficult to use in some instances and tend to limit the rotational operation of the load binder handle that can be further complicated when additional obstructions are in the way such as the truck deck or a trailer fender well. Even though, with the chain along side of the load binder, this method is a common method of securing a load while using one chain with one hook hooked to the load and the other end of the chain through a trailer deck eyelet and then attached to the load-binder and then the other end of the load binder attached to the chain closer to the load chain attachment point. The single chain with a single hook method is common and convenient in many situations. Another method of binding a load on a truck deck is to attach the load binder directly to the truck deck on one end of the binder and the other end of the binder directly to the load with an eyelet attachment on the load, this method also normally allows a full rotational motion of the load binder handle operation with no interference.

There are stark differences between lever-load-binders and ratchet-load-binders. Both binders employ a lever that is used as a handle for the binder to compress or expand the length between the load binder's hooks in order to tighten or release the tension on the load binder and the chain. For clarity in the contents of this description, the lever-load-binder handle is referred to as a lever-handle, and the ratchet-load-binder handle is referred to as a ratchet-handle.

The lever-load-binder generally employs a long lever-handle using a single motion of the lever-handle to achieve sufficient leverage to tighten the chain on the load, while the ratchet-load-binder generally employs a somewhat shorter ratchet-handle that utilizes many multiple shorter motions of the ratchet-handle to tighten the chain on the load. The operation of the ratchet-load-binder generally takes a longer time period to tighten the chain on the load when compared to the lever-load-binder, although the ratchet-load-binder usually is more effective at securing a very tight chain tension on the load. If the single motion of the lever-load-binder lever-handle does not achieve the desired tension on the chain, the operator of the binder will then reset the position of one of the binder hooks on the chain to remove more slack from the chain and then attempt a second motion of the lever-handle to securely tighten the chain. The lever-load-binder utilizes a quicker but less dependable process to tighten the chain on the load when compared to the ratchet-load-binder, while the ratchet-load-binder is a slower, more dependable, and more labor intensive process to tighten the chain on the load.

The main reason the ratchet-load-binder is slower than the lever-load-binder is that the ratchet-load-binder takes much longer to remove the slack from the chain than the lever-load-binder. The lever-load-bind usually takes just one (1) throw motion of the lever-handle in a motion of 180 degrees while the ratchet-load-binder may require about fifteen (15) ninety degree throws of motion to remove the slack in the chain, the reason being, the high tension producing screw threads of the ratchet-load-binder moves the hooks of the load-binder at a substantially slower rate than the lever-load-binder moves the hooks. During the removal of the chains from the load, either load-binder is required to produce the same slack in the chain that was present after the install of the load-binder on the chain before tightening the chain tension. The reason for the requirement of the production of slack in the chain for the removal of the chain is to allow the hooks to clear the chain link it was initially installed on to tighten the chain.

The lever-load-binder can also present a situation that can cause bodily harm to the user of the binder if the lever-handle is not released properly from a closed-and-bound-position or when the lever-handle is accidentally released from the closed-and-bound-position position. Releasing the lever-handle from the closed-and-bound-position must be carefully completed because the tension on the bound chain may cause the lever-handle to release with great force and fast movement. The operator of the lever-load-binder normally holds onto and controls the release speed of the lever-handle when releasing the lever-load-binder from the closed-and-bound-position.

The great force and speed movement of the lever-handle may be responsible for bodily injury of the lever-load-binder operator if the lever-handle accidentally comes in contact with the operator when releasing with great force and speed. In some instances, an operator of the lever-load-binder has been known to tie and secure the lever-handle in the bound position to prevent an accidental release of the lever-handle to the unbound position, although tying and securing of the lever-handle in the bound position is not known to be suggested by the manufacture's of the lever-load-binders. The ratchet-load-binder uses screw threads and a much slower rate of relieving tension from the bound chain, reducing the changes of the operator being injured by the ratchet load binder.

Description of the Lever-Load-Binder

The lever-load-binder comprises a lever-handle 100, a lever-handle-base 104, a straight-arm 110, a straight-arm-pivot-connection-to-handle 114, a U-arm 106, a U-arm-pivot-connection-to-handle 112, a U-arm-pivot-joint 116, two hooks 128, 130 one loosely and pivotally attached to the straight arm 110 and one loosely and pivotally attached to the U-arm 106, each with a rotating connector 120, 122 and a flexible connector 124, 126. The lever-handle-base 104 comprises the straight-arm-pivot-connection to handle 114 which is near the lever-handle-pivot-point 101 which is in the same position as the U-arm-pivot-connection-to-handle 112. The connection position of the straight-arm to the lever-handle base 104 is about ¾ of the length of the straight-arm measuring from the lever-handle-pivot-point, the straight-arm 110 pivots in the lever-handle-slot 105, the lever-handle-base and the straight-arm-pivot-connection-to-handle pivots in and out of the U-arm.

While the lever-binder 96 two hooks are being pulled and tension-bound, the determining factors of when the lever binder is positioned in either:

a) a closed-and-held-position 138 138.

b) a neutral position (wherein tension forces are not forcing the lever-handle to move to the closed-and-held-position 138 138 or to the opening position), or c) an opening position, is described below:

a) closed-and-held-position 318 138:

the straight-arm-pivot-connection-to-handle 114 is on or mostly on the opposing side of the U-arm-centerline 108 as compared to the position of the lever-handle, the U-arm-pivot-connection-to-handle 112 position is on or mostly on the same side of the straight-arm-centerline 109 as compared to the position of the lever-handle, and the lever-handle is pressed against the U-arm-pivot-joint 116.

b) neutral position:

the straight-arm-pivot-connection-to-handle 114 is inline with the U-arm-centerline 108.

the U-arm-pivot-connection-to-handle 112 is aligned and inline with the straight-arm-centerline 109, and the U-arm-centerline 108 is parallel and inline with the straight-arm-centerline 109.

c) the opening position:

the straight-arm-pivot-connection-to-handle 114 is on or mostly on the same side of the U-arm-centerline 108 as compared to the position of the lever-handle, the straight-arm-centerline 109 is not inline with the U-arm-centerline 108, and the straight-arm-centerline 109 is on the same side of the U-arm-centerline 108 as compared to the position of the lever-handle.

In a closed-and-held-position 138 138 of the lever handle (see FIG. 4 and FIG. 8) and when the two hooks are being pulled and tension-bound, this causes the lever-handle 100 to be held in the closed-and-held-position 138 138 while the lever-handle 100 is positioned against the U-arm pivot joint 116, and the U-arm-centerline 108 is approximately six (6) degrees of pivot from the straight-arm-centerline 109. The U-arm-pivot-connection-to-handle 112 is on or mostly on the same side of the straight-arm-centerline 109 as the lever-handle. The straight-arm-pivot-connection-to-handle 114 is on or mostly on the opposing side of the straight-arm-centerline 109 that the lever-handle is on. Tension pulling on the hooks maintains the lever-handle in the closed position until the lever-handle is forced out of this position by the operator of the load binder.

A neutral position of the lever-load-binder lever-handle (see FIG. 5 and FIG. 9): is attained when the U-arm-centerline 108 is aligned inline with the straight-arm-centerline 109. In the neutral position of the lever-handle, the lever-handle is neither being pulled to the opening-position or pulled to the closed-position, although if the lever-handle maintains the neutral position, the lever-load-binder bound position is somewhat tighter when compared to the lever-handle being in the closed-position. The additional tightness of the neutral position is the result of the removal of the distance between the lever-handle-pivot-point 101 and the straight-arm-pivot-connection to handle 114, the distance being reflected as a change in the lever-handle to straight-arm-pivot-joint spread 136 and the lever-handle to U-arm-pivot-joint spread 134.

An opening position of the lever-load-binder lever-handle (see FIG. 6 and FIG. 10): and with the two hooks being pulled tension-bound causing the lever-handle 100 to go to an open position when the lever-handle 100 is positioned off of the U-arm pivot joint 116 and the U-arm-centerline 108 is not aligned inline with the straight-arm-centerline 109, the U-arm-pivot-connection-to-handle 112 is opposed to the same side of the straight-arm-centerline 109 as the lever-handle, and the straight-arm-pivot-connection-to-handle 114 is on or mostly on the same side of the straight-arm-centerline 109 as the major portion of the lever-handle. Tension pulling on the hooks maintains the lever-handle open position and the opening force of the handle will increase as the handle moved further in the opening position.

The lever-handle 100 controls the tension on the hooks 128,130 through pivoting of the lever-handle. Moving the lever-handle 100 from the open position to the neutral position provides tension on the hooks when the hooks are connected to a chain that is connected to a load being carried on a trailer deck. The neutral position draws the straight-arm-pivot connection to handle 114 closer to the U-arm-pivot-joint 116 (see FIG. 5), and the neutral position draws the U-arm-pivot-connection-to-handle 112 closer to the straight-arm-pivot-joint 118 (see FIG. 5), therefore drawing the U-arm and the straight-arm closer together shortening the overall length of the lever binder and creating tension on the hooks by shortening the overall length of the lever-binder.

Moving the lever-handle from the neutral position (see FIG. 5), to the closed-and-held-position 138 138 (see FIG. 4) will release a small amount of tension from the hooks as a pivoting of the lever-handle causes a movement of the U-arm-centerline 108 alignment degrees when compared to the straight-arm-centerline 109 alignment degrees to shift from zero degrees alignment between the two centerlines to approximately six (6) degrees of difference 133 between the two centerlines (see FIGS. 8 and 9). The six degrees shift in the alignment of the U-arm and the straight-arm does slightly loosen the tension on the hooks, but also provides an important purpose of holding the lever-handle in the closed position when tension is on the chains with a load being bound in place. With the lever-handle moved into the closed-and-held-position 138 138, the straight-arm-pivot-connection-to-handle 114 moves from an inline alignment with the U-arm-centerline 108 of the neutral position (see FIG. 5) to an offset alignment with the U-arm-centerline 108 in the closed-and-held-position 138 138 (see FIG. 4). With tension on the hooks, the new offset position of the straight-arm-pivot-connection-to-handle 114 pulls the lever-handle tight to contact the U-arm-pivot-joint 116 and be held in place with substantial pressure that usually maintains the closed position of the lever-handle (see FIG. 4). Since the straight-arm-pivot-connection-to-handle 114 moved from an inline alignment with the U-arm-centerline 108 and is now on the opposing side of the U-arm-centerline 108 when compared to the lever-handle and the straight-arm is being pulled on by tension on the hooks, the lever-handle is held against the U-arm-pivot-joint 116 with pressure.

Moving the lever-handle from the closed-and-held-position 138 138 to the opening positions no only takes a substantial amount of strength for the reason that moving the lever-handle from the closed-and-held-position 138 138 requires the operator to move the lever-handle into the neutral position, therefore adding more tension to the hooks of the lever-binder. Since the neutral position provides the greatest amount of tension on the hooks, moving the lever-handle from the neutral position to the opening positions will cause the lever-handle to move on its own once the lever-handle moves past the neutral position and many times depending on the tension supplied to the hooks while in the neutral position, the lever-handle will move with great force and speed. The great force and speed of movement of the lever-handle has created documented instances of injuries sustained to the operators of lever-binders. In summary, the lever-binder is a faster method of binding a load on a trailer, but the lever-binder is also a more dangerous method of binding a load on a trailer when compared to the slower moving ratchet-binder.

REFERENCE NUMERALS FOR THE LEVER-BINDER

For the convenience of the reader, the following is a list of reference numbers used in this description.

96 Lever load binder (prior art)
98 Modified lever load binder—disclosed invention part
100 lever-handle
101 lever-handle-pivot-point
102 lever-handle-grasp-end
104 lever-handle-base
105 lever-handle-slot
106 U-arm
108 U-arm-longitudinal-centerline
109 straight-arm-longitudinal-centerline
110 straight-arm
111 straight-arm attachment to short second rod
112 U-arm-pivot-connection-to-handle
114 straight-arm-pivot-connection-to-handle
116 U-arm-pivot-joint
118 straight-arm-pivot-joint
120 first rotating connector
122 second rotating connector
124 first flexible connector
126 second flexible connector
128 first hook
130 second hook
132 Approximate twelve (12) degrees of difference
133 Approximate six (6) degrees of difference
134 lever-handle to U-arm-pivot-joint spread
136 lever-handle to straight-arm-pivot-joint spread
138 closed-and-held-position
140 neutral-position
142 opening-positions

DESCRIPTION OF THE RATCHET-LOAD-BINDER

A ratchet-load-binder primarily comprises an elongated tube having opposing open ends and internal threads, two rods, a handle with a gear and a ratcheting U-shaped pawl mounted in the handle. The U-shaped pawl herein referred to as a U-pawl. The tube has interior threads starting at each end with each end threading in opposite directions, a first end having right-hand internal threads and a tube second end having left-hand internal threads. A gear with exterior teeth is rigidly attached around the tube and causes the tube to rotate with the gear. The two rods have exterior threads starting on one end and proceeding along the rod, the rod threads matching the tube threads. A releasable means for connection such as a hook is usually loosely and flexibly attached to the other end of each rod for attaching to a chain, eyelet or strap. The handle has two sides that wrap around the tube and is rotatably independent from the gear and tube, the ratcheting U-pawl when attached to the handle and pivotally secured next to the gear provides a first-driving-position of the tube, a second-driving-position of the tube and a neutral-position located between the two driving positions, therefore, able to drive the rotation of the gear and the tube in a first-rotational-direction or a second-rotational-direction, depending on the chosen position of the U-pawl. A means for applying flexible pressure on the U-pawl 18 such as a first spring 10 holds the U-pawl in its selected position, the spring providing a sizable amount of pressure towards the U-pawl. The first-rotation-direction draws the rods closer together, therefore tightening the chain on the load and the second rotational direction causing the rods to move farther apart, therefore loosening the chain on the load. After loosely installing the ratchet-load-binder and the accompanied chains on or around a load to be secured, the binder U-pawl is set to the first-driving-position to tighten the chain for transportation of the load. After the load is ready for removal from the truck or trailer, the binder U-pawl is set to the second-driving-position to loosen and remove the chains and the binder from the load.

REFERENCE NUMERALS FOR THE RATCHET BINDER

For the convenience of the reader, the following is a list of reference numbers used in this description.

1 Lever and Ratchet Hybrid Load Binder (disclosed invention)
2 Ratchet load binder—prior Art
3 Modified ratchet load binder—disclosed invention part
4 Handle assembly
5 Handle assembly U-pawl housing
6 Handle assembly shaft
7 Handle assembly first side
8 Handle assembly second side
9 Handle assembly U-pawl axle hole
10 First spring
12 First spring hook
14 First spring stabilizer stem
16 First spring stabilizer stein ball end
18 U-Pawl
**18*a*** first-driving-position
**18*b*** second-driving-position
**18*c*** middle-neutral-position
19 U-Pawl head
20 U-Pawl eyelet
22 U-Pawl first arm
24 U-Pawl second arm
26 U-Pawl first tooth
28 U-Pawl second tooth
30 U-Pawl pivot axle
32 U-Pawl pivot hole
34 Gear
35 Gear teeth
36 Gear teeth roots
37 Gear teeth tips
38 Tube
**38*a*** Short tube
39 Tube first end internal threads
40 Tube second end internal threads
41 First rod
**41*a*** Short first rod
42 Second rod
**42*a*** Short second rod
44 First rod external threads, right hand threads
45 Second rod external threads, left hand threads
46 Rod eyelet
47 Rod first end
48 Rod flexible connector
49 Rod second end
50 Rod hook
76 U-Pawl head, narrow shape.
84 First rotational direction
86 Second rotational direction For clarity of the drawings the U-pawl position will also reflect the disclosed invention mode of operation as follows:

"**18*a*** U-pawl first-driving-position" corresponds to turning the tube to tighten the bind on the load, with or without the blocking device installed.

"**18*b*** U-pawl second-driving-position" corresponds to turning the tube to loosen the bind on the load with no blocking device installed.

"**18*c*** U-pawl middle-neutral-position" corresponds to a U-pawl position allowing freewheeling of the gear and the tube in either the tightening or loosening direction.

Comparisons of the Lever-Load-Binder and the Ratchet-Load-Binder

After the end user secures a load-binder to a chain that is also secured to the load and is ready to have tension applied to the chain to bind the load, the chain will have excess slack in the chain that will have to be removed before the chain will begin to tighten with tension. One of the reasons there will be excess slack in the chain is because the end user can only pull the chain to a minimal tightness while attaching the second of the two hooks to a chain link. The chain is usually heavy in nature and moving the chain through the load securing eyelet or the trailer deck eyelet can be an arduous task. Another reason there will be excess slack in the chain is because the most popular hooks that are used to attach to the chain link requires the hook to clear one link and then attach to the next link after the cleared link. When the hook attaches to the chain link, the hook will slide back about one and a half inches through the slot in the hook and then stop at the next chain link. The one and a half inches of travel of the hook over the chain link creates a considerable amount of slack in the chain that also needs to be taken up before tight tension to the chain is applied by the load-binder. This excess slack in the chain is created whether the load binder is the ratchet-load-binder or the lever-load-binder.

The lever-load-binder uses a single approximately 180 degree movement of the lever-handle to remove the slack in the chain and also apply the required tension on the chain to properly secure the load. The ratchet-load-binder uses many multiple shorter motions of the ratchet-handle to tighten the chain on the load, each motion of the ratchet binder handle is usually 90 degrees and the number of 90 degree motions of the handle may be as much as 15 motions to remove the slack in the chain before the chain starts to tighten with tension. 15 motions of the ratchet-load-binder handle not only takes excess time by the end user, it will expend some energy from the end user after performing this task on four to eight ratchet-load binders at each removal or installation of the securing chains. After the slack it taken up on the chain using the ratchet-load-binder, usually 5-9 more 90 degree motions of the handle is sufficient to provide the proper tension on the chain to secure the load. The screw threads on the ratchet-load-binder move the hooks of the binder very slowly but with great tensioning ability and safety for the end user of the ratchet-load-binder, although the slack-removing-phase of the chain tightening will require the movement of the load-binder handle of approximately 1350 degrees of rotation.

If the lever-load-binder centerlines degrees difference would be designed to be positioned at a degrees substantially more than about six (6) degrees, such as about twelve (12) degrees out of parallel alignment with each other when the lever-handle is in the closed-position, the binding chain would be in a quite loose position and not providing a tight bind on the load to be effective in securing the load correctly. The further the centerlines degrees difference pivots, the looser the bind on the chain is because the further the centerlines degrees difference pivots away from the parallel position, the shorter the effective length of the straight-arm becomes because of the two centerlines degrees difference, therefore loosening the binding chain. The above scenario is the reason the lever-load-binder is designed with the U-arm-centerline being positioned approximately 6 degrees off of the straight-arm-centerline.

Upon placing the lever-handle of the lever-load-binder in the closed- and held-position after passing through the neutral position, the slight loosening of the binding chain is a disadvantage when compared to using the ratchet-load-binder in securing a load with a chain. The lever binder slight loosening of the chain is required to position the centerlines degrees difference maintaining the lever-load-binder lever-handle in the closed-and-held-position 138, although if the lever-load-binder is properly installed, the chain still remains relatively tight and bound on the load with the handle in the closed position.

In summary, the lever-load-binder is a quicker, less labor intensive, but a less dependable and a more dangerous process of securing a load, while the ratchet-load-binder is slower, and much more labor intensive, but a more dependable and safer process of securing a load.

BRIEF SUMMARY OF THE INVENTION

The popularity of the lever-load-binder has waned during the previous years while the ratchet-load-binder has gained in popularity in recent years most likely because the ratchet-load-binder is safer in use for the end user and the ratchet-load-binder ease of applying the proper tension on the load securing chains is desirable. The lever-load-binder can sometimes be "hit and miss" when the tension on the chain after the first throw of the handle is not sufficient, in effect, the lever-load binder may be more difficult to use for the non-professional or the part-time user. For these reasons, many end users prefer the ratchet-load-binders instead of the lever-load-binders. Although, the end user may distain the length of time and effort it takes to remove the excess slack from the chain before the ratchet-load-binder begins to apply tension on the chain to secure the load, and the end user may also distain the length of time and effort it takes to create excess slack in the chain in order to remove the load binder hooks from the chain during the removal process of the load from the truck or trailer.

During the tightening-operation of the chains on the load, there is a slack-removing-phase and a tension-tightening-phase to both the lever load-binder and the ratchet load-binder, the slack-removing-phase being first in succession and the tension-tightening-phase being second in succession. In addition, during the loosening-operation of the chains on the load, there is a tension-loosening-phase and a slack-creating-phase to each type of load-binder, the tension-loosening-phase being first in succession and the slack-creating-phase being second in succession. The lever-load-binder completes both the slack-removing-phase and the tension-tightening-phase in one 180 degree motion of the lever-handle, while the ratchet-load-binder uses approximately 1350 degrees of rotation to complete the slack-removing-phase and another approximately 450 degrees of rotation to complete the tension-tightening-phase when tightening the chains on the load.

The current invention creates a solution to this problem by not only combining the ratchet-load-binder and the lever-load-binder into a single hybrid-load binder, but also provides a much needed modification to the lever-load-binder that requires the tension-tightening-phase of the tightening operation to be accomplished by the ratchet-load-binder and also requires the tension-loosening-phase of the loosening operation to be accomplished by the ratchet-load-binder. The tension-tightening-phase and the tension-loosening-phase when performed by the ratchet-load-binder are a safer and more efficient method when compared to the conventional lever-load binder in applying or removing tension from the chain. In addition, the slack-removing-phase of the tightening-operation is substantially more quickly accomplished by the modified-lever-load-binder, and the slack-creating-phase of the loosening-operation is substantially more quickly accomplished by the modified-lever-load-binder. Since the slack-removing-phase and the slack-creating-phase when accomplished by the modified-lever-load-binder is completed in one quick 180 degrees of motion by the lever-handle, and it takes the ratchet-load-binder 1350 degrees of motion to complete the same action of the slack-removing-phase or the slack-creating-phase as the modified-lever-load-binder, the end user will choose the modified-lever-load-binder portion of the hybrid-load-binder to quickly complete these two phases. Being the hybrid-load-binder is safer and more effective to use than independently using the lever-load-binder, and the hybrid-load-binder is quicker and less tiresome to use than independently using the ratchet-load-binder, each use for completing the process of binding the load and removing the load from a truck or trailer, the invention creates a solution to a problem in the industrial use of the product.

The invention in this application for patent comprises a modified ratchet-load-binder combined with a modified lever-load-binder. The modification to the lever-load-binder renders the lever-load-binder useless when used independently as a stand-alone lever-load-binder, the modification, therefore, is not a modification that would normally be considered by an end user of the product. Using the modified-lever-load-binder separately from the ratchet-load-binder would be useless in securing a load on a truck or trailer, the modification would prevent the securing chains from securing the load with enough tension to properly tightly secure the load in place. The modified lever-load-hinder must be used in combination with the modified ratchet-load-binder to achieve its effective use. In the combined use of the modified lever-load-binder with the modified ratchet-load-binder, the operator of the hybrid-load-binder uses the lever-load-binder to first remove the excess slack of the securing chain with one 180 degree throw of the lever handle, then, the operator uses the ratchet-load-binder to perform the task of applying substantial tightening tension on the securing chain with approximately five 90 degree turns of the ratchet-load-binder handle, securing the load properly in place. To remove the securing chain from a load, the operator of the hybrid-load-binder would first remove the tension from the chain using the modified ratchet-load-binder with approximately five 90 degree turns of the ratchet-load-binder handle, and then create excess slack in the chain to remove the chain from the load using the modified lever-load-binder with one 180 degree throw of the lever handle.

After the modified-lever-load-binder is in the closed position, and substantial tension is placed on the chain by the ratchet-load-binder, the modified and increased degree angle of about 12 degrees between the angles of the U-arm-centerline 108 and the straight-arm-centerline 109 makes releasing the lever-handle of the modified-lever-load-binder virtually impossible and keeps the lever-handle in a non-releasable position until tension is relieved from the chain using the ratchet-load-binder. With substantial tension already placed on the chain, attempting to move the lever-load-binder lever-handle from the closed position resting against the U-arm-pivot-joint 116 to the opening position would attempt to move the lever-handle 100 to the neutral position, which would be virtually impossible as this would require the distance between the binder hooks to be reduced requiring additional tension to be placed on the chain. To move the lever-handle into the neutral position, the distance between the hybrid-load-binder hooks would have to be reduced further than possible, this movement is not possible because of the substantial tension already placed on the chain by the ratchet load binder portion of the hybrid-load-binder, consequently, the chain would not be able to accept more tension, therefore preventing the hybrid-lever-load-binder handle from being moved from the closed position to the neutral position, which also prevents the hybrid-lever-load-binder handle from being moved to the opening position from the closed position.

In the situation of a chain bound load on a truck or trailer deck with the hybrid-load-binder lever-handle in the closed-and-held-position 138, the lever-handle cannot be moved to the opening position while the chain is under substantial tension. This situation just mentioned results in the ability to assist in preventing the unauthorized removal or loosening of the hybrid-load-binder by installing a blocking device on the ratchet-load-binder that prevents the U-pawl of the ratchet-load-binder from being moved in the position that would loosen the bound chain, although, this device allows the tightening of the chain using the ratchet-load-binder handle. In this situation, there is no need to lock the handle of the modified-lever-load-binder in place since it is securely held in place by the tension of the chain, meaning only one security device is needed to be installed on the hybrid-load-binder to assist in providing security for the bound load. The blocking device can be identified in the U.S. patent application by Mollick Ser. No. 17/083,811 filed Oct. 29, 2020 and granted as a U.S. Pat. No. 11,440,458.

When combining the modified lever-load-binder with the ratchet-load-binder to assemble the hybrid-load-binder, in the addition of the modification of the U-arm-centerline 108 in relation to the straight-arm-centerline 109 to cause the hooks of the hybrid-load-binder to move closer together than when releasing the lever-handle of a conventional lever-load-binder to allow the handle of the lever-load-binder to be held in place very securely after substantial tension is placed on the load securing chains using the ratchet-load-binder, other modifications are made to both binders to combine the binders. The modified-lever-load-binder and the modified ratchet-load-binder are additionally modified by removing certain parts that are not required by their use because they are replaced by the same or near same parts in the other binder in the combination, these parts being one hook and rotating and flexible connecting parts. In addition, the tube of the ratchet-load-binder is decreased in length since the extended length of tube is not required in its new use by the fact that the ratchet-load-binder tube is now not needed to remove excess slack from the chain since this excess chain slack removal is accomplished by the modified-lever-load-binder.

The modification to the lever-load-binder U-arm-centerline 108 and the straight-arm-centerline 109 degrees difference makes the lever-load-binder useless if used independently from the ratchet-load-binder (see FIG. 13). The modification to the lever-load-binder results in the lever-load-binder not being able to independently apply substantial tension on a binding chain to secure a load on a truck or trailer deck.

The modification to the ratchet-load-binder shortened tube and rods makes the ratchet-load-binder useless if used independently from the lever-load-binder (see FIG. 12). The modification to the ratchet-load-binder results in the short tube not being able to independently apply substantial tension on a binding chain to secure a load on a truck or trailer deck. The tube of a conventional ratchet-load-binder will allow at approximately seventy 90-degree turns of the handle, whereas the tube of the modified ratchet-load-binder will allow approximately twenty to twenty five 90-degree turns of the handle, not allowing a properly tension bound chain on the load in some situations. Although the length of the tube in the modified ratchet-load-binder may be adjusted to any needed length. Although, the modification of the lever-load-binder is a required change to effect a securely bound chain that will deter vandalism or theft.

An example of the Lever and Ratchet Hybrid Load Binder 1 may be described below:

I) a ratchet-load-binder comprising:

a) an elongated tube having opposing open ends and internal threads, a first end having right-hand internal threads and a second end having left-hand internal threads, a gear encircling the tube, the gear rigidly attached to the tube, the gear having externally facing teeth;

b) a first rod comprising right hand external threads mating to the threads in the first end of the tube, the threads starting at a first end of the rod and extending along the rod, a second rod comprising left hand external threads mating to the threads in the second end of the tube, the threads starting at a first end of the rod and extending along the rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each rod having a connection device or the ability to attach another device to the rod;

c) a handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly first and second sides encircling the tube;

d) a pivotal attached U-shaped-pawl referred herein as a U-pawl with a first tooth on one end of the U-pawl and a second tooth on the opposing end of the U-pawl, the first tooth for driving rotation of the tube in the first-rotational-direction and the second tooth for driving the rotation of the tube in the second-rotational-direction, the U-pawl teeth for engaging the gear teeth, the U-pawl attached to the handle assembly between the first side and the second side, the U-pawl pivoting on an axle inserted at a pivot hole on the U-pawl, the axle being attached to the handle assembly first side and the second side that straddles the gear, a pivot axle on the U-pawl being generally centered between the first tooth and the second tooth of the U-pawl, the U-pawl comprising;

a. a first-driving-position:

b. a second-driving-position;

c. a middle-neutral-position, and wherein either i) the middle-neutral-position is not securely held in position, or ii) the middle-neutral-position is securely held in position;

e) a means for applying flexible pressure on the U-pawl causing the U-pawl to be held securely in either the first-driving-position or the second-driving-position, the means for applying flexible pressure on the U-pawl keeping the U-pawl first tooth or the second tooth engaged with the gear teeth during ratcheting rotation of the tube, the means for applying flexible pressure on the U-pawl allowing flexible pivotal movement of the U-pawl first tooth or the second tooth around gear teeth roots and gear teeth tips for incremental back and forth movement of the handle assembly and the U-pawl during a ratcheting rotational movement of the tube, wherein moving the U-pawl from the first-driving-position to the second-driving-position or vice versa requires the U-pawl to be manually and forcefully pivoted;

f) The tube and the rods being reduced in length when compared to a conventional ratchet load binder, the reduction length of the tube being approximately two inches on each side of the tube for an approximate four inch reduction of the overall length of the tube, and each rod reduced approximately two inches in length;

II) a lever-load-binder comprising:

a) a handle with a base and a grab end;

b) a U-arm that straddles the handle and is pivotally connected to the handle;

c) a straight-arm that pivots in and out of a handle slot and is pivotally connected to the handle;

d) the U-arm comprising a pivot joint on the end opposing the U-arm handle connection;

e) a means of attaching a connection device to the U-arm pivot joint;

f) the lever load binder comprising a i) closed and held position of the handle, ii) a middle neutral position of the handle, and iii) opening positions of the handle; the lever-load-binder when drawn with a U-arm-longitudinal-centerline and a straight-arm-longitudinal-centerline comprises an approximate pivot degree difference of approximately twelve (12) degrees of pivot difference of the i-arm-centerline and the straight-arm-centerline when the lever-handle 100 is in the closed and held position;

III) a means of attaching the straight-arm of the lever-load binder to the second rod of the ratchet binder creating a single combination device.

BRIEF DESCRIPTION OF THE DRAWINGS

A better understanding of the present invention will be had upon reference to the following description in conjunction with the accompanying drawings in which like numerals refer to like parts throughout the views wherein.

Although, the centerlines are not displayed.

Figure 12:
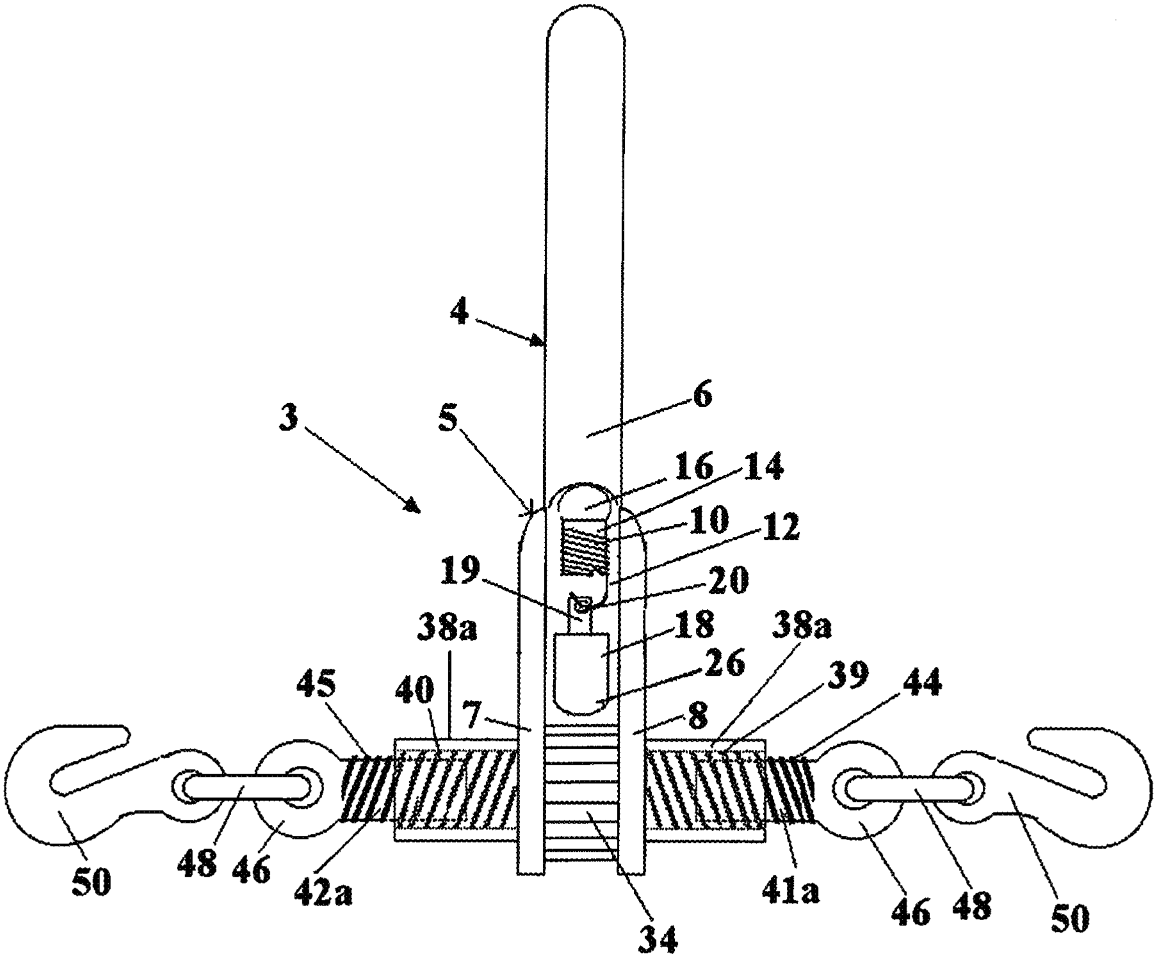
FIG. 12 is a view side elevation of the Modified ratchet-load-binder with the shortened tube and hooks and attachments still comprised on both ends. Although, this modified ratchet-load binder is useless in securing a load on a trailer deck, this modified ratchet-load binder is used for the disclosed invention.
Figure 13:
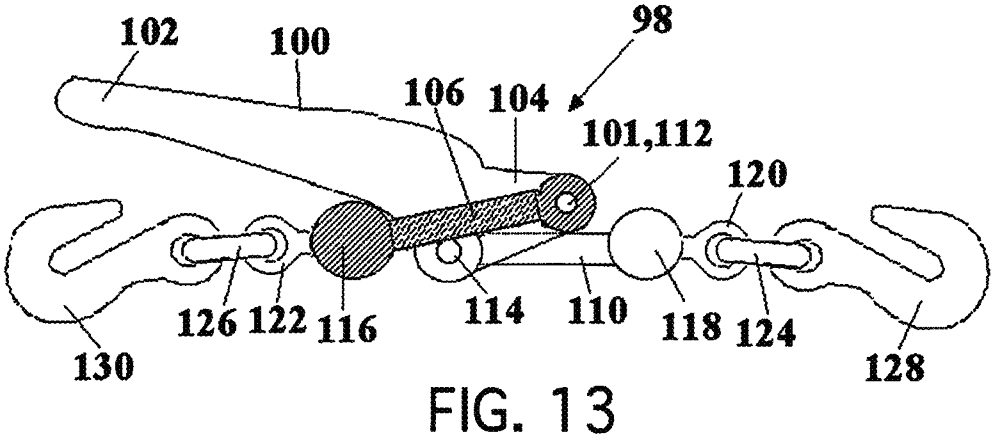
FIG. 13 is a side view elevation of the Modified lever-load-binder with the U-arm-centerline 108 and the straight-arm-centerline 109 degrees difference between the two at approximately twelve degrees. Although, this modified lever-load binder is useless in securing a load on a trailer deck, this modified lever-load binder is used for the disclosed invention.
Figure 14:
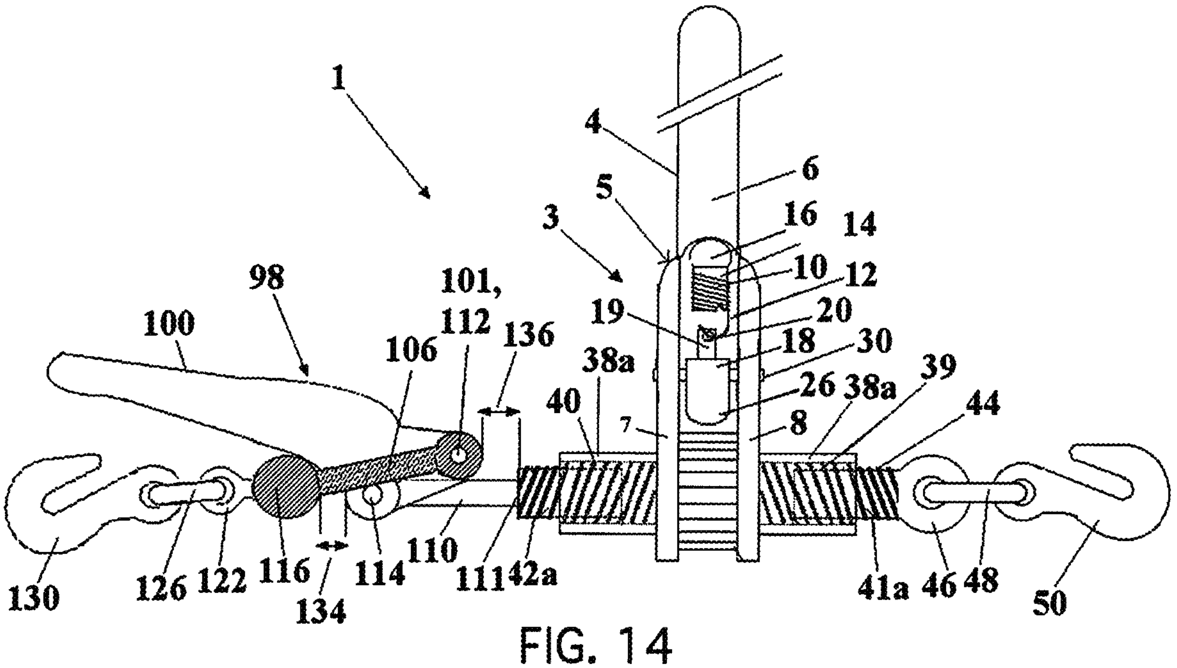

FIG. 14 is a side view elevation of the hybrid-load-binder with the unneeded parts removed from FIG. 12 and FIG. 13. Also showing are the U-arm-centerline 108 and the straight-arm-centerline 109 degrees difference between the two at approximately twelve degrees.

Although, the centerlines are not displayed.

Figure 15:
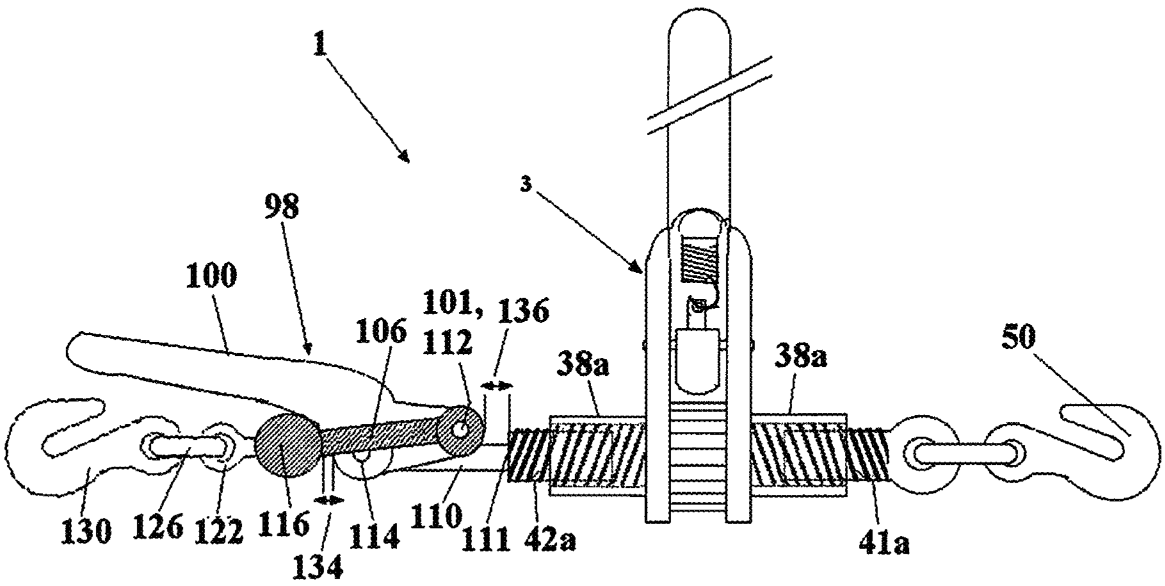

FIG. 15 is a side view elevation of the hybrid-load-binder with the unneeded parts removed.

FIG. 12 and FIG. 13. Also showing are the U-arm-centerline 108 and the straight-arm-centerline 109 degrees deference between the two at approximately six degrees. Although, the centerlines are not displayed.

Figure 16:
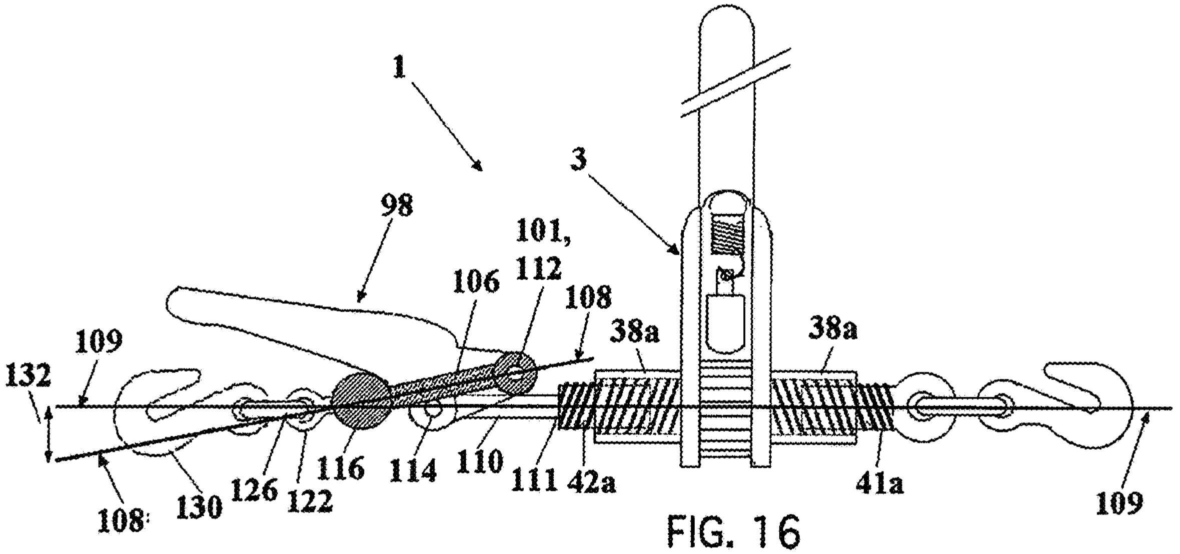

FIG. 16 is the same drawing as FIG. 14 with the U-arm-centerline 108 and the straight-arm-centerline displayed.

Figure 17:
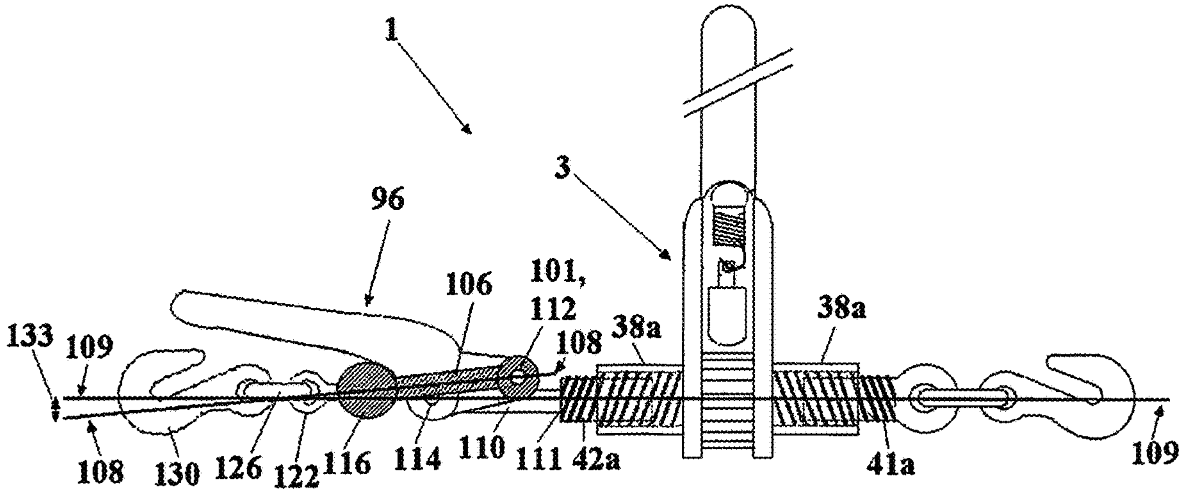

FIG. 17 is the same drawing as FIG. 15 with the i-arm-centerline 108 and the straight-arm-centerline displayed.

Figure 18:
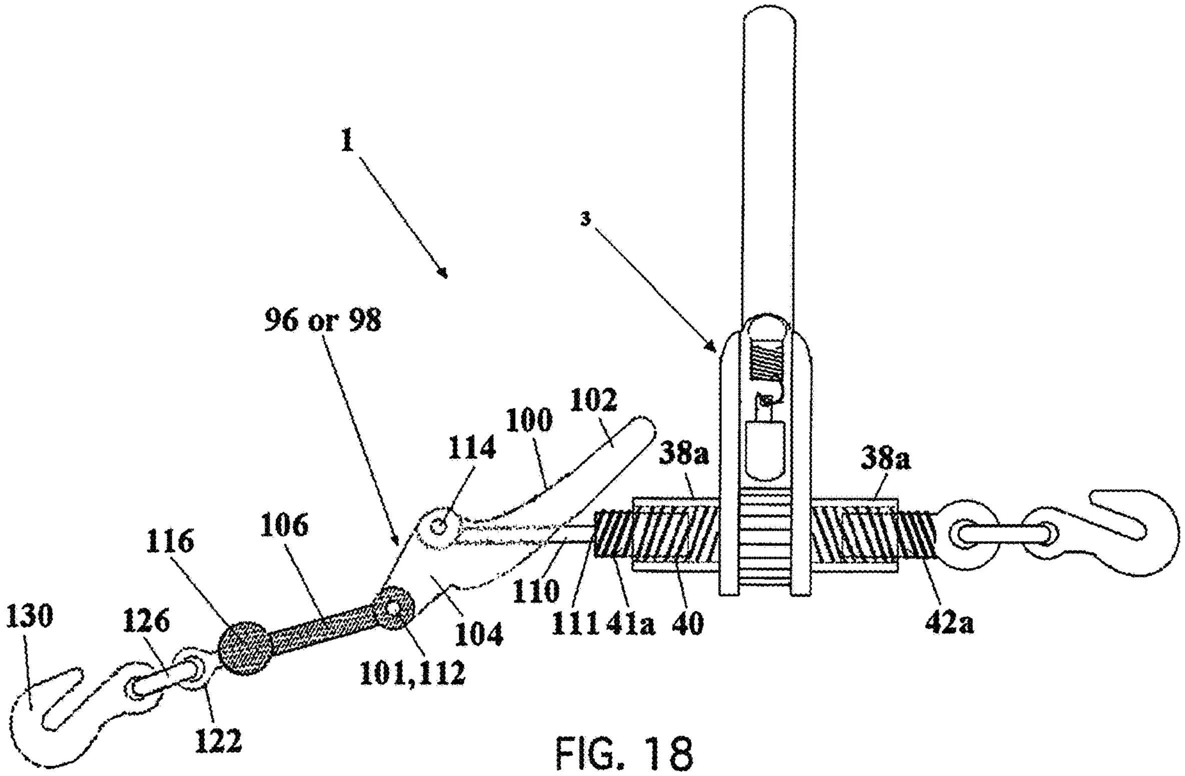

FIG. 18 is a side view elevation of the hybrid-load-binder in the fully open position.

Figure 19:
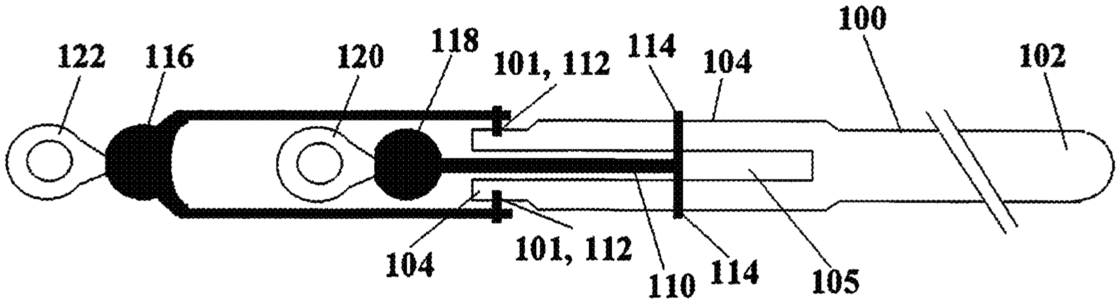

FIG. 19 is a top view elevation of the lever-load-binder handle, straight-arm, and U-arm components.

For the convenience of the reader, the following is a reference number used in this description of the invention.

1 lever-and-ratchet-hybrid-load-binder (disclosed invention)

DETAILED DESCRIPTION OF THE INVENTION

Figure 1:
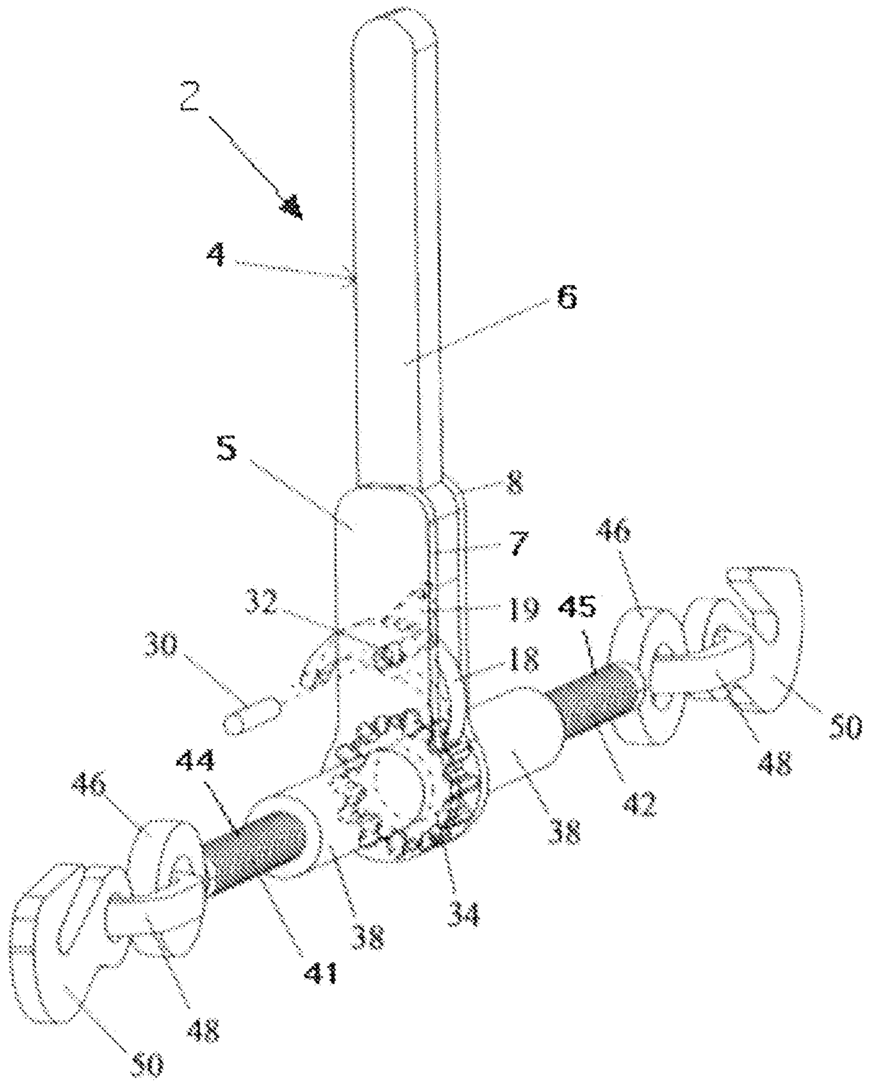
FIG. 1 Prior art
FIG. 1 is a perspective view showing a prior art ratchet load binder.
Figure 2:
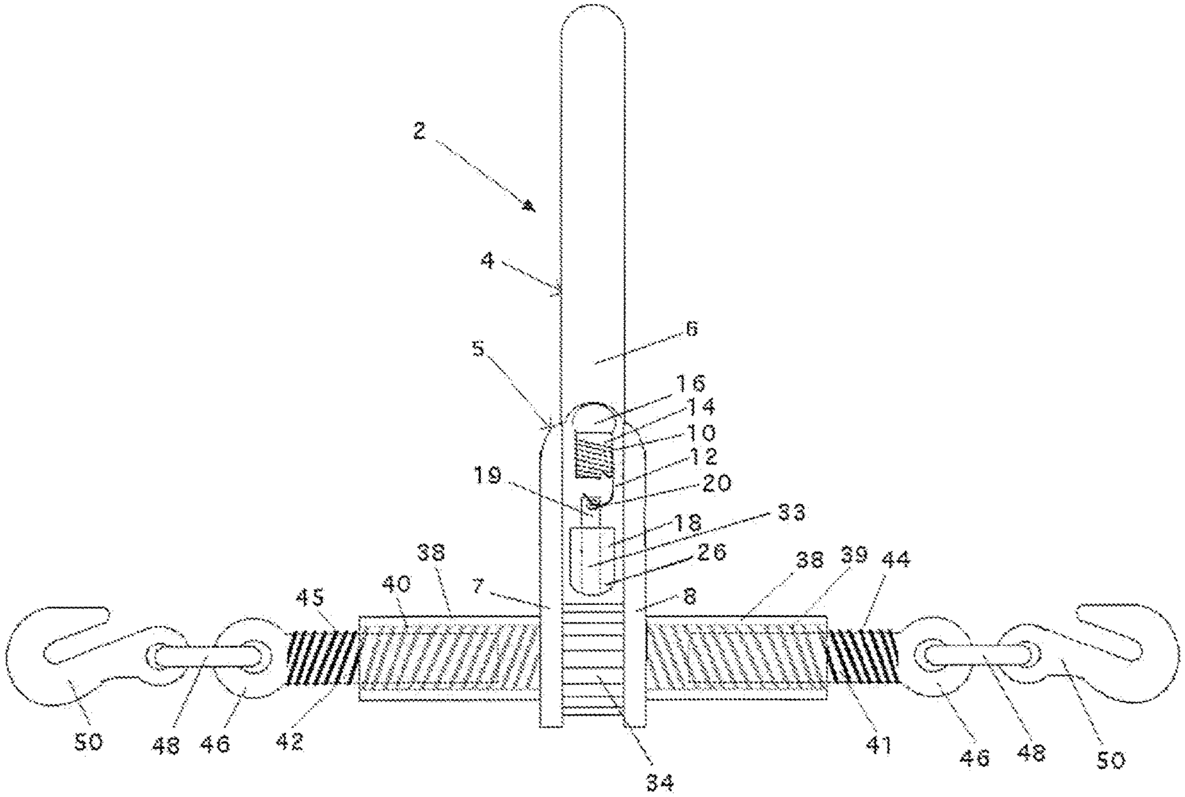
FIG. 2 Prior art
FIG. 2 is a front view elevation view of the disclosed invention schematically showing the interior parts between the two sides of the ratchet load binder, showing the tube interior and the first set of holes and the second set of holes.
Figure 3A:
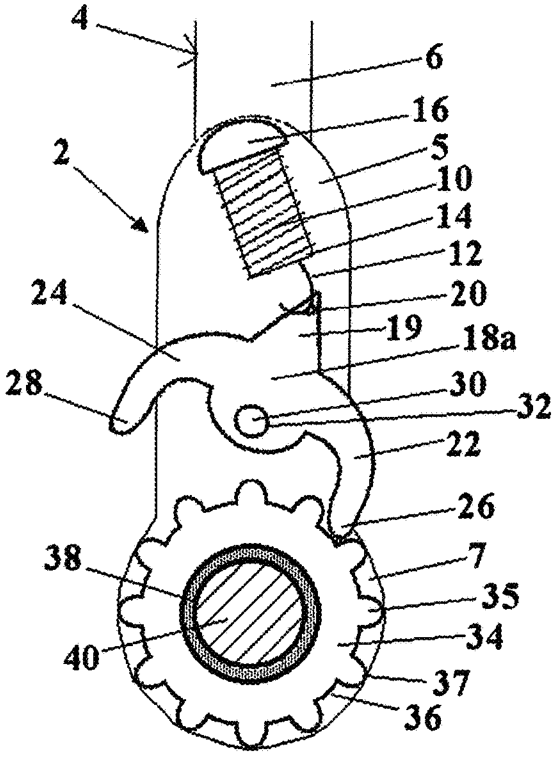
FIG. 3a Prior art
FIG. 3*a* is a side view elevation section view of a prior art ratchet load binder 1 schematically showing the interior parts of the handle assembly U-pawl housing between the handle assembly sides. The U-pawl engaging the gear teeth root and held firmly in the first-driving-position.
Figure 3B:
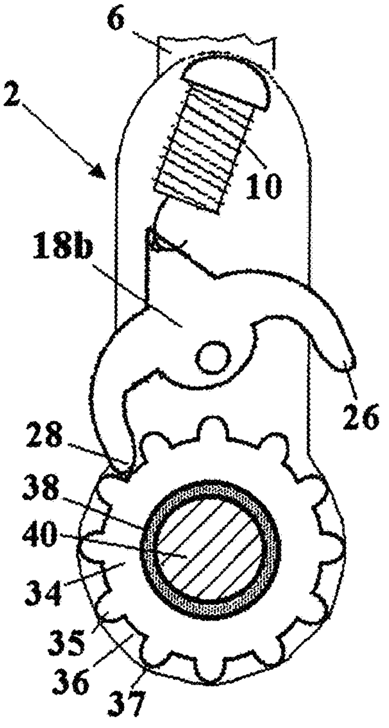
FIG. 3b Prior art
FIG. 3*b* is a side view elevation section view of a prior art ratchet load binder 1 schematically showing the interior parts of the handle assembly U-pawl housing between the handle assembly sides. The U-pawl engaging the gear teeth root and held firmly in the second-driving-position.
Figure 3C:
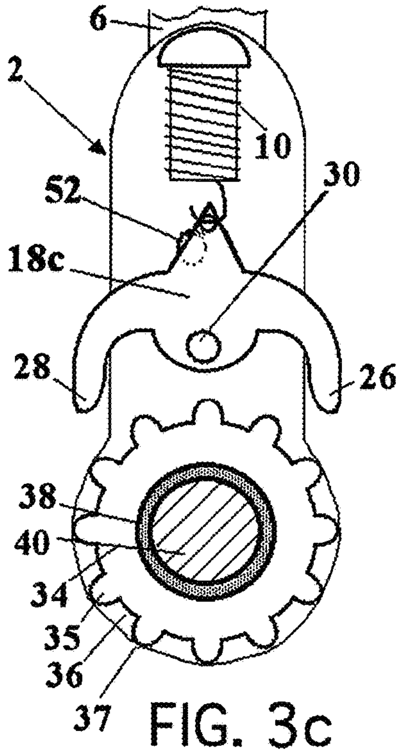
FIG. 3c Prior art
FIG. 3*c* is a side view elevation section view of the disclosed invention schematically showing the position of the U-pawl relative to the gear. The U-pawl residing in the neutral-position, the U-pawl is not in contact with the gear at any point of rotation of the gear.

FIG. 1 is a perspective view and FIG. 2 is a side view showing a prior art ratchet load binder 1. The handle assembly 4 comprises the handle assembly U-pawl housing 5 with a handle assembly first side 7 and a handle assembly second side 8 attached to a handle assembly shaft 6. The handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly first and second sides encircling the tube. The U-pawl 18 is positioned between the handle assembly first side 7 and second side 8. Attached to the U-pawl 18 is the U-pawl head 19 where the first spring attaches. The U-pawl 18 pivots on the U-pawl pivot axle 30 through the U-pawl pivot hole 30. The U-pawl 18 ratchet turns the gear encircling the tube, the gear rigidly attached to the tube, the gear having externally facing teeth, the U-pawl 18 ratchet turning the tube 38 in a chosen direction. The tube 38 comprises internal threads 40 located inside the tube 38. The tube 38 having opposing open ends and internal threads, the tube first end threads 39 are right hand internal threads and the tube second end threads 40 are left hand internal threads. A first rod 41 comprising right hand external threads 44 mating to the threads in the first end of the tube 39, the threads starting at the rod first end 47 and extending along the first rod 41, and a second rod 42 comprising left hand external threads mating to the threads in the tube second end 40, the threads starting at the rod first end 47 and extending along the second rod 42, the external threads of the first rod 41 match the tube first end internal threads 39 and the external threads of the second rod 42 match the tube second end internal threads 40, the first rod 41 threading into the first end of the tube 39, the second rod 42 threading into the second end of the tube 40. The tube 38 movable in a first-rotational-direction 84 and the tube 38 movable in a second-rotational-direction 86. The first-rotational-direction 84 of the tube 38 moves the rods closer to each other while the rods are stationary in rotation, the second-rotational-direction 86 of the tube 38 moves the rods farther away from each other while the rods are stationary in rotation, each rod second end 49 having a releasable connection device such as a rod hook 50. Attached to the end of the first rod 41 is a rod eyelet 46 and attached to the end of the second rod 42 is a rod eyelet 46. The rod eyelet 46 flexibly connecting to a rod flexible connector 48, and the rod flexible connector 48 is flexibly connecting to a rod hook 50. The U-pawl 18 is shown in the first-driving-position **18*a* (see FIG. 3*a***).

FIGS. **3*a*, 3*b*, 3*c* are side view elevation section views of a prior art ratchet load binder 1 schematically showing the interior parts of the handle assembly U-pawl housing 5 between the handle assembly 4 first side 7 (see FIG. 1) and second side 8 (see FIG. 1). The handle assembly shaft 6 is shown attached to the handle assembly U-pawl assembly 5 that houses the first spring 10 that is wrapped around the first spring stabilizer stein 14 with a first spring stabilizer stem ball end 16 attached to the end of the stabilizer stem 14. The first spring stabilizer stem ball end 16 pivots at the top of the handle assembly U-pawl housing 5 as the U-pawl 18 is moved from one position to another position allowing pivotal movement of the first spring 10. The pivotal attached U-shaped-pawl 18 referred herein as a U-pawl 18 with a first tooth 22 on one end of the U-pawl 18 and a second tooth 24 on the opposing end of the U-pawl 18, the first tooth 22 for driving the rotation of the tube 38 in the first-rotational-direction 84 and the second tooth 24 for driving the rotation of the tube 38 in the second-rotational-direction 86, the U-pawl teeth 22+24 for engaging the gear teeth 35, the U-pawl 18 attached to the handle assembly between the first side 7 and the second side 8, the U-pawl 18 pivoting on an axle 30 inserted at a pivot hole 32 on the U-pawl 18, the axle 30 being attached to the handle assembly first side 7 and the second side 8 that straddles the gear 34, the pivot axle 30 on the U-pawl 18 being generally centered between the first tooth 22 and the second tooth 24 of the U-pawl 18, the U-pawl 18** having;

i. a first-driving-position **18*a*, ii. a second-driving-position 18*b*, and iii. a middle-neutral-position 18*c***.

The first spring hook 12 attaches to the U-pawl head 19 through a U-pawl eyelet 20 allowing pivoting action of the U-pawl 18 and the first spring 10. The U-pawl first arm 22 is shown with the U-pawl first tooth 26 located at the end of the U-pawl first arm 22. The U-pawl second arm 24 is shown with the U-pawl second tooth 28 located at the end of the U-pawl second arm 24. The U-pawl pivot hole 32 is located at a center point of the U-pawl 18 to pivot on a U-pawl pivot axle 30, the U-pawl pivot axle 30 attaching to the handle assembly 4 first side 7 (not shown) and second side 8 (not identified). The U-pawl first tooth 26 is shown engaging the gear 34 between the gear teeth 35 at the gear tooth root 36 and also showing the gear teeth tips 37. The handle assembly U-pawl assembly 5 connects to the handle assembly first side 7 (not shown) and the handle assembly second side 8 (not identified). The tube 38 is shown with the tube first end internal threads 39 (not shown) and the tube second end internal threads 40. The first spring 10 applying flexible pressure on the U-pawl 18 causing the U-pawl 18 to be held securely in either the first-driving-position **18*a* or the second-driving-position 18*b*. The first spring 10 being secured in the handle assembly 4 and keeping the U-pawl 18 first tooth 26 or the second tooth 28 engaged with the gear teeth 35 during ratcheting rotation of the tube 38. The first spring 10 allowing flexible pivotal movement of the U-pawl 18 first tooth 26 or the second tooth 28 around the gear teeth roots 36 and the gear teeth tips 37 for incremental back and forth movement of the handle assembly 4 and the U-pawl 18 during the ratcheting rotational movement of the tube 38 while maintaining the U-pawl 18 first tooth 26 or the second tooth 28 in contact with the gear 34. Moving the U-pawl 18 from the first-driving-position 18*a* to the second-driving-position 18*b* or vice versa requires the U-pawl 18 to be manually and forcefully pivoted, and wherein pivoting the U-pawl 18 initially contracts the first spring 10 while moving the U-pawl 18 towards the middle-neutral-position 18*c* and then expands the first spring 10 when the U-pawl moves past the middle-neutral-position 18*c* to the opposing driving position 18*a* or 18*b***.

Figure 4:
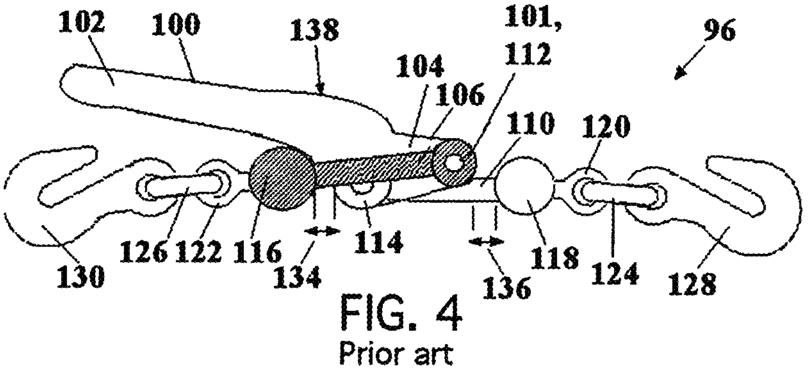
FIG. 4 Prior art
FIG. 4 is a side view elevation of a conventional lever-load-binder with the handle in the closed-and-held-position 138.

FIG. 4 is a side view elevation of a prior art conventional lever-load-binder 96 with the lever-handle 100 in the closed-and-held-position 138 and with an approximate pivot degree difference of approximately six (6) degrees of pivot difference of the U-arm-centerline 108 and the straight-arm-centerline 109 when the handle 100 is in the closed-and-held-position 138. The centerlines 108, 109 are not shown in this drawing, see FIG. 8 for the displayed centerlines 108, 109. Shown is the lever-handle 100 in the closed-and-held-position 138, the lever-handle-grasp-end 102, the lever-handle-base 104, the U-arm-pivot-joint 116, the U-arm 106, the U-arm-pivot-connection-to-handle 112, the straight-arm 110, the straight-arm-pivot-connection-to-handle 114, the straight-arm-pivot-joint 118, the first rotating connector 120, the first flexible connector 124, the first hook 128, the second rotating connector 122, the second flexible connector 126, the second hook 130. Additionally shown is the lever-handle to U-arm-pivot-joint spread 134 and the lever-handle to straight-arm-pivot-joint spread 136 when the handle is in the closed-and-held-position 138. The lever-handle to U-arm-pivot-joint spread 134 and the lever-handle to straight-arm-pivot-joint spread 136 are noticeably larger than the same spreads in FIG. 5. The reason for the larger spreads in FIG. 4 is the U-arm's pivot degree difference when compared to the straight-arm pivot degrees. The U-arm's pivot degree difference moves straight-arm-pivot-connection-to-handle 114 towards the first hook 128 increasing the overall length of the lever-load-binder 96 and providing less tension on the lever-load binder 96 when bound.

Figure 5:
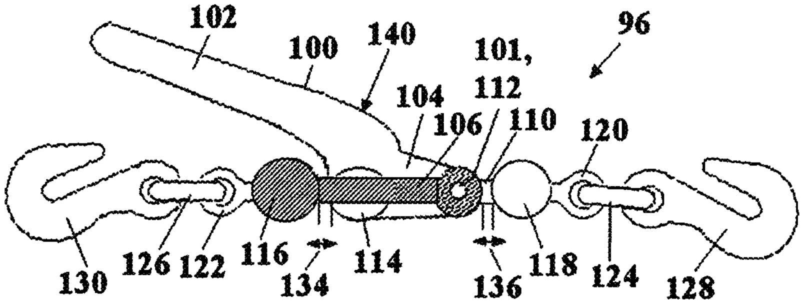
FIG. 5 Prior art
FIG. 5 is a side view elevation of a conventional lever-load-binder with the handle in the middle neutral position.

FIG. 5 is a side view elevation of a prior art conventional lever-load-binder 96 with the lever-handle 100 in the neutral position and with an approximate pivot degree difference of approximately six (6) degrees of the U-arm-centerline 108 and the straight-arm-centerline 109 when the handle 100 is in the closed-and-held-position 138. The centerlines 108, 109 are not shown in this drawing, See FIG. 8 for the displayed centerlines. The lever-handle to U-arm-pivot-joint spread 134 and the lever-handle to straight-arm-pivot-joint spread 136 are noticeably smaller than the same spreads in FIG. 4. The reason for the smaller spreads in FIG. 4 is the U-arm's pivot degree is the same as the straight-arm pivot degree. This alignment of the pivot degrees between the U-arm and the straight-arm moves straight-arm-pivot-connection-to-handle 114 towards the second hook 1130 shortening the overall length of the lever-load-binder 96 and providing more tension on the lever-load binder 96 when bound.

Figure 6:
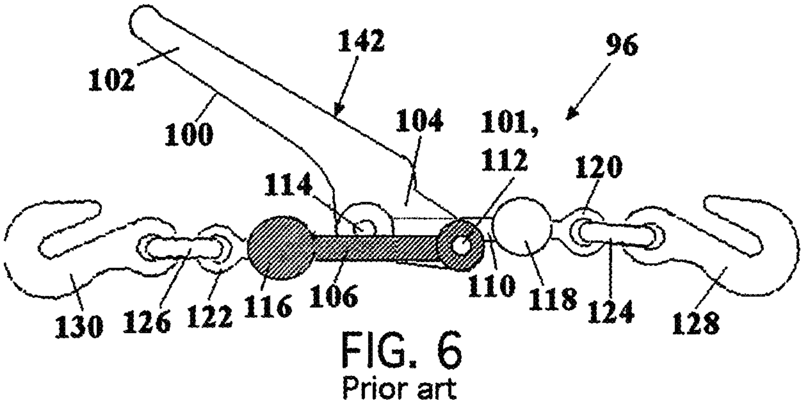
FIG. 6 Prior art
FIG. 6 is a side view elevation of a conventional lever-load-binder with the handle in the beginnings of the opening positions.

FIG. 6 is a side view elevation of a prior art conventional lever-load-binder 96 with the lever-handle 100 in the opening position showing the straight-arm-pivot-connection-to-handle 114 moving up and towards the first-hook 128 increasing the overall length of the lever-load-binder 96 and providing less tension on the lever-load hinder 96 when hound.

Figure 7:
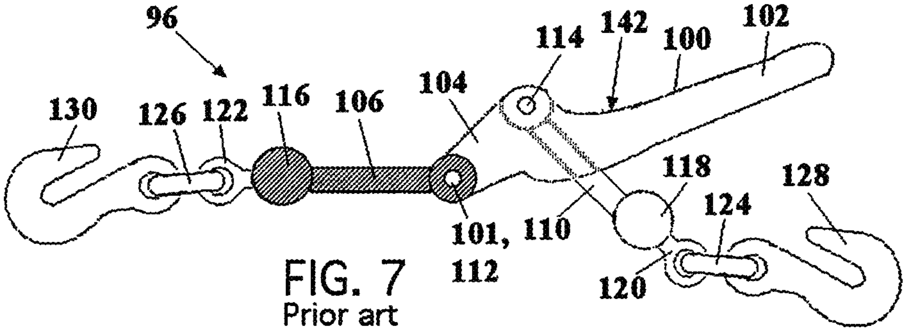
FIG. 7 Prior art
FIG. 7 is a side view elevation of a conventional lever-load-binder with the handle in the open position.

FIG. 7 is a side view elevation of the fully open prior art, conventional lever-load binder 96.

Figure 8:
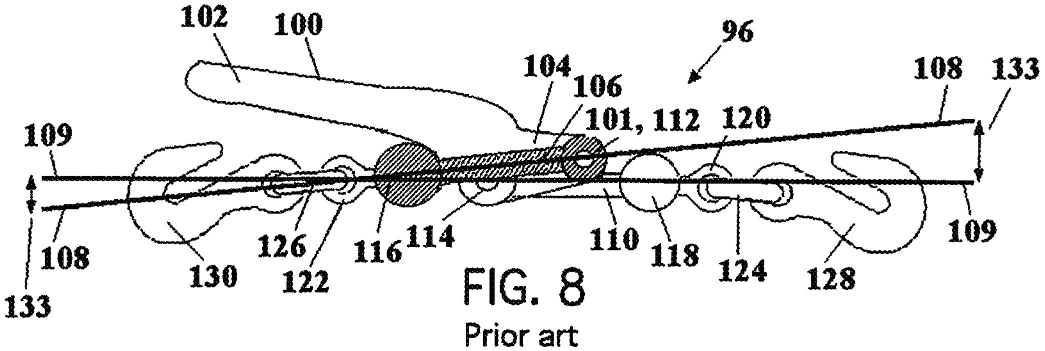
FIG. 8 Prior art
FIG. 8 is a side view elevation of a conventional lever-load-hinder similar to FIG. 4 and also displaying the U-arm-centerline and the straight-arm-centerline.

FIG. 8 is a side view elevation of a prior art conventional lever-load-binder 96 with the lever-handle in the closed-and-held-position 138 and with an approximate pivot degree difference of approximately six (6) degrees of the U-arm-centerline and the straight-arm-centerline when the handle 100 is in the closed-and-held-position 138. The centerlines 108, 109 are shown in this drawing. The U-arm-centerline 108 is shown along the U-arm and the straight-arm-centerline 109 is shown along the straight-arm 110. The degrees spread difference is shown as 133 on both ends of the binder.

Figure 9:
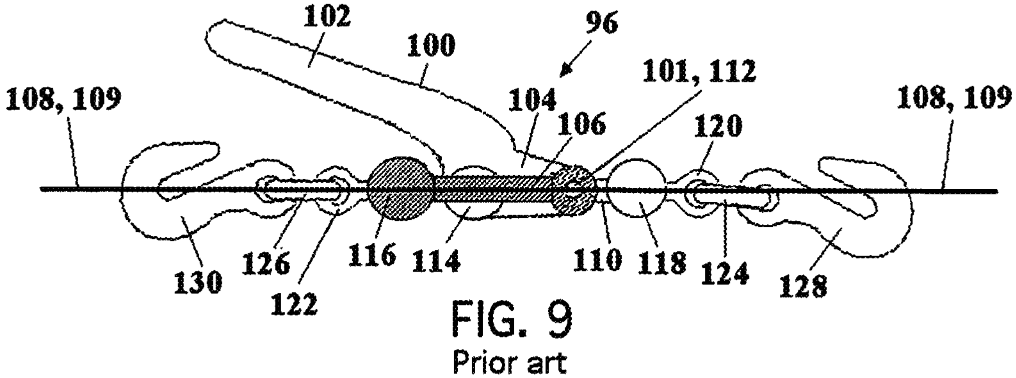
FIG. 9 Prior art
FIG. 9 is a side view elevation of a conventional lever-load-binder similar to FIG. 5 and also displaying the U-arm-centerline and the straight-arm-centerline.

FIG. 9 is a side view elevation of a prior art conventional lever-load-binder 96 with the lever-handle in the neutral position and with matching pivot degrees of the U-arm-centerline 108 and the straight-arm-centerline 109. The centerlines 108, 109 are shown in this drawing. The U-arm-centerline 108 is shown along the U-arm 106 and the straight-arm-centerline 109 is shown along the straight-arm 110. There is no degrees spread difference between the two centerlines 108, 109 and the centerlines are parallel and inline with each other.

Figure 10:
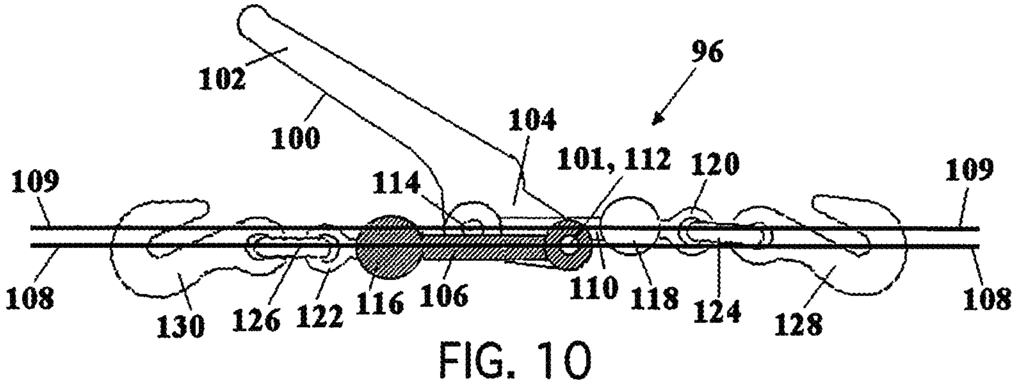
FIG. 10 Prior art
FIG. 10 is a side view elevation of a conventional lever-load-binder similar to FIG. 6 and also displaying the U-arm-centerline and the straight-arm-centerline.

FIG. 10 is a side view elevation of a prior art conventional lever-load-binder 96 with the lever-handle 100 in the beginning of the opening position and with the U-arm-centerline 108 and the straight-arm-centerline 109 being parallel and not inline with each other. The centerlines 108, 109 are shown in this drawing. The U-arm-centerline 108 is shown along the U-arm 106 and the straight-arm-centerline 109 is shown along the straight-arm 110. There is no degrees spread difference between the two centerlines 108, 109.

Figure 11:
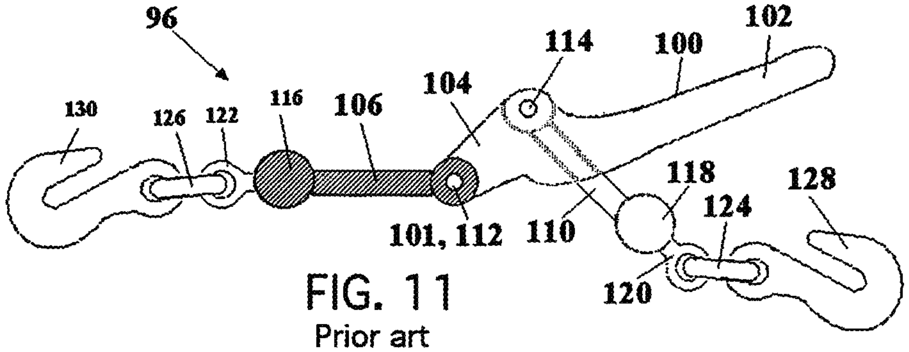
FIG. 11 Prior art
FIG. 11 is the same as FIG. 7.

FIG. 11 is the same drawing as FIG. 7 and is used as reference on this page.

FIG. 12 is a side view elevation showing a modified ratchet-load-binder 3 modified for the purpose of the disclosed invention. The modified ratchet-load-binder 3 is to be combined and attached to the modified lever-load-binder 98 to complete the disclosed invention lever-and-ratchet-hybrid-load-binder 1. The modification to the ratchet-load-binder 3 is a shortened tube 38*a* and shortened rods 41*a* and 42*a*. For the modified ratchet-load-binder 3 to be combined with the modified lever-load-binder, removal is required of one of the hooks 50, one of the rod flexible connectors 48, and one of the rod eyelets 46, each on the same side of the binder. The handle assembly 4 comprises the handle assembly U-pawl housing 5 with a handle assembly first side 7 and a handle assembly 4 second side 8 attached to a handle assembly shaft 6. The handle assembly 4 comprising a shaft 6 and two separated sides 7, 8, the sides 7, 8 rotatably mounted around the tube 38*a* to rotate completely around the tube 38*a* while straddling the gear 34, the handle assembly 4 generally perpendicular to the tube 38*a*, the handle assembly 4 having a first side 7 positioned on one side of the gear 34 and a second side 8 positioned on the opposing side of the gear 34, the handle assembly first and second sides encircling the short tube 38*a*. The U-pawl 18 is positioned between the handle assembly first side 7 and second side 8. Attached to the U-pawl 18 is the U-pawl head 19 where the first spring attaches. The U-pawl 18 pivots on the U-pawl pivot axle 30 through the U-pawl pivot hole 30. The U-pawl 18 ratchet turns the gear encircling the short tube 38*a*, the gear 34 rigidly attached to the tube 38*a*, the gear 34 having externally facing teeth, the U-pawl 18 ratchet turning the short tube 38*a* in a chosen direction. The short tube 38*a* comprises internal threads 40 located inside the short tube 38*a*. The short tube 38*a* having opposing open ends and internal threads, the tube 38*a* first end threads 39 are right hand internal threads and the tube 38*a* second end threads 40 are left hand internal threads. A short first rod 41*a* comprising right hand external threads 44 mating to the threads in the first end 39 of the tube 38*a*, the threads 44 starting at the rod first end 47 and extending along the short first rod 41*a*, and a short second rod 42*a* comprising left hand external threads 45 mating to the threads in the tube 38*a* second end 40, the threads 45 starting at the rod second end 49 and extending along the short second rod 42*a*, the external threads 44 of the short first rod 41*a* match the tube 38*a* first end internal threads 39 and the external threads of the short second rod 42*a* match the tube 38*a* second end internal threads 40, the short first rod 41*a* threading into the first end 39 of the tube 38*a*, the short second rod 42*a* threading into the second end 40 of the tube 38*a*. The short tube 38*a* movable in a first-rotational-direction 84 and the short tube 38*a* movable in a second-rotational-direction 86. The first-rotational-direction 84 of the short tube 38*a* moves the rods closer to each other while the rods are stationary in rotation, the second-rotational-direction 86 of the short tube 38*a* moves the rods farther away from each other while the rods are stationary in rotation, each rod second end 49 having a releasable connection device such as a rod hook 50. Attached to the end of the short first rod 41*a* is a rod eyelet 46 and attached to the end of the short second rod 42*a* is a rod eyelet 46. The rod eyelet 46 flexibly connecting to a rod flexible connector 48, and the rod flexible connector 48 is flexibly connecting to a rod hook 50. The U-pawl 18 is shown in the first-driving-position 18*a* (see FIG. 3*a*).

FIG. 12 is also a side view elevation showing a modified ratchet-load-binder 3 modified for the purpose of the disclosed invention. The modified ratchet-load-binder 3 is to be combined and attached to the modified lever-load-binder 98 to complete the disclosed invention lever-and-ratchet-hybrid-load-binder 1. The modification to the ratchet-load-binder 3 is a shortened tube 38*a* and shortened rods 41*a* and 42*a*. For the modified ratchet-load-binder 3 to be combined with the modified lever-load-binder, FIG. 13 is a side view elevation showing a modified lever-load-binder 98 modified for the purpose of the disclosed invention lever-and-ratchet-hybrid-load-binder 1. The modified lever-load-binder 98 is to be combined and attached to the modified ratchet-load-binder 3 to complete the disclosed invention lever-and-ratchet-hybrid-load-binder 1. The modification to the lever-load-binder 98 is an approximate pivot degree difference of approximately twelve (12) degrees of pivot difference of the U-arm-centerline and the straight-arm-centerline when the handle 100 is in the closed-and-held-position 138. A prior art lever-load-binder comprises approximately six (6) degrees of pivot difference of the U-arm-centerline 108 and the straight-arm-centerline 109 when the handle 100 is in the closed-and-held-position 138. To attach the modified lever-load-binder 98 to the modified ratchet-load-binder 3, certain components of each binder must be removed. The straight-arm-pivot-joint 118, the first rotating connector 120, the first flexible connector 124, and the first hook 128 are removed from the modified lever-load-binder 98. (see FIG. 14) The modified lever-load-binder 98 straight-arm 110 is to be attached to the modified ratchet-load-binder 3 short second rod 42*a* with an attachment means such as metal welding. The rod eyelet 46 is to be removed from the short second rod 42*a*.

FIG. 13 shows a side view elevation of the modified lever-load-hinder 98 with the lever-handle 100 in the closed-and-held-position 138 and with an approximate pivot degree difference of approximately twelve (12) degrees of pivot difference of the U-arm-centerline and the straight-arm-centerline when the handle 100 is in the closed-and-held-position 138. The approximately twelve (12) degrees of pivot difference of the U-arm-centerline 108 and the straight-arm-centerline 109 when the handle 100 is in the closed-and-held-position 138 is a deviation from the prior art lever-load-binder 96 that is approximately six (6) degrees of pivot difference of the U-arm-centerline 108 and the straight-arm-centerline 109 when the handle 100 is in the closed-and-held-position 138. The centerlines 108, 109 are not shown in this drawing, see FIG. 16 for the displayed centerlines 108, 109 on the disclosed invention lever-and-ratchet-hybrid-load-binder 1 with a twelve (12) degrees centerlines difference. (see FIG. 17) for the displayed centerlines 108, 109 on the disclosed invention lever-and-ratchet-hybrid-load-binder 1 with a six (6) degrees centerlines difference. FIG. 13 shows the lever-handle 100 in the closed-and-held-position 138, the lever-handle-grasp-end 102, the lever-handle-base 104, the U-arm-pivot-joint 116, the U-arm 106, the U-arm-pivot-connection-to-handle 112, the straight-arm 110, the straight-arm-pivot-connection-to-handle 114, the straight-arm-pivot-joint 118, the first rotating connector 120, the first flexible connector 124, the first hook 128, the second rotating connector 122, the second flexible connector 126, the second hook 130.

FIG. 14 shows a side view elevation of the disclosed invention, lever-and-ratchet-hybrid-load-binder 1 with the lever-handle 100 of the modified lever-load-binder 3 in the closed-and-held-position 138. The lever-and-ratchet-hybrid-load-binder 1 is created by combining a modified prior art lever-load-binder 98 with a modified prior art ratchet-load binder 3. The modifications to each prior art binder would render each binder useless if used on their own without combining the two binders together. The modifications to each binder are not obvious to perform since the modifications render the binder useless when used on their own. Each modified binder used on its own cannot properly bind a chain to a load in a tightly bound configuration, the two modified binders must work as attached partners to attain a tight bind on a chain and a load. The two modified binders 98, 3 are attached at the straight-arm attachment to short second rod 111 of the modified lever-load-binder and to the second short rod 42*a* of the modified ratchet-load-binder 3. The modified-ratchet-load-binder 3 second rod 45 in FIG. 14 does not comprise the hook 50, flexible connector 48 and the eyelet 46. These components are removed and in their place are similar items comprised on the modified lever-load-binder 98 of the hook 130, flexible connector 126, and second rotating connector 122.

FIG. 14 shows the modified lever-load-binder 98 of FIG. 13 of approximately twelve (12) degrees of pivot difference of the U-arm-centerline 108 and the straight-arm-centerline 109 when the handle 100 is in the closed-and-held-position 138. (see FIG. 16) for the displayed centerlines 108, 109 on the drawing. FIG. 14 also shows the modified ratchet-load-binder 3 with the rod hook 50, rod flexible connector 48, and the eyelet 46 removed to allow the attachment of the modified lever-load-binder 98 straight-arm 110 to the short second rod 42*a*. FIG. 14 is the preferred configuration of the lever-and-ratchet-hybrid-load-binder 1. In the operation of this preferred lever-and-ratchet-hybrid-load-binder 1, after the tension on the hooks 130, 50 is substantially exerted using the ratchet-load binder portion of the lever-and-ratchet-hybrid-load-binder 1, it would be nearly impossible to move the handle 100 of the modified lever-load-binder 98 to the opening position due to the additional tension applied to the hooks 130, 50 when the modified lever-load-binder 98 handle 100 is moved from the closed and held position to the neutral position. Shown in FIG. 14 of the modified ratchet-load-binder 3 is the handle assembly first side 7, the handle assembly second side 8, the tube second end internal threads 40, the rod eyelet 46, the rod flexible connector 48, the first rod external threads, right hand threads 44, the tube first end internal threads 39, the U-Pawl first tooth 26, the U-Pawl pivot axle 30, the U-Pawl 18, the U-Pawl eyelet 20, the first spring hook 12, the first spring 10, first spring stabilizer stem 14, the first spring stabilizer stem ball end 16, the handle assembly shaft 6, the handle assembly 4, the handle assembly U-pawl housing 5, the U-Pawl head 19.

FIG. 15 shows the lever-and-ratchet-hybrid-load-binder 1 with the prior art lever-load-binder 96 with the lever-handle in the closed-and-held-position 138 and with an approximate pivot degree difference of approximately six (6) degrees of pivot difference of the U-arm-centerline 108 and the straight-arm-centerline 109 when the handle 100 is in the closed-and-held-position 138. Also shown is the modified ratchet-load binder 3 with the short tube 38*a*, short first rod 41*a*, and the short second rod 42*a*. Although this configuration of the invention may not be the preferred design since it would allow the prior art lever-load-binder 96 lever-handle to be placed in the opening position after the modified ratchet-load binder 3 has been tightened with substantial tension.

FIG. 14 and FIG. 15 show the lever-handle to U-arm-pivot-joint spread 134 and the lever-handle to straight-arm-pivot-joint spread 136 on each drawing. As noted, the spreads 134 and 136 are a smaller spread in FIG. 15 when compared to FIG. 14. The difference in the spreads 134 and 136 are the result of the difference in degrees of the U-arm-centerline 108 and the straight-arm-centerline 109 when the handle 100 is in the closed-and-held-position 138. The prior art lever-load-binder 96 has approximately six (6)

degrees of pivot difference of the U-arm-centerline 108 and the straight-arm-centerline 109 and the modified lever-load-binder 98 has approximately twelve (12) degrees of pivot difference of the U-arm-centerline 108 and the straight-arm-centerline 109. Since FIG. 14 comprises twelve (12) degrees of pivot difference, the straight-arm 110 extends further away from the lever-handle 100 increasing the overall length of the lever-and-ratchet-hybrid-load-binder 1 when compared to FIG. 15. The lever-handle to U-arm-pivot-joint spread 134 and the lever-handle to straight-arm-pivot-joint spread 136 in FIG. 14 are larger than the same areas of FIG. 15.

To release created tension on the FIG. 14 and FIG. 15 hooks 130, 50 without first releasing the tension on the hooks 130, 50 using the ratchet-load binder 98 portion of the invention 1, both lever-and-ratchet-hybrid-load-binder 1 in FIG. 14 and FIG. 15 would need to have the handle moved from the closed-and-held-position 138 to the neutral position and then to the opening position. The lever-and-ratchet-hybrid-load-binder 1 in FIG. 14 with the twelve (12) degrees of pivot difference is required to close a larger gap of both the U-arm-pivot-joint spread 134 and the lever-handle to straight-arm-pivot-joint spread 136 requiring more force to move the lever-handle from the closed-and-held-position 138 to the neutral position. The additional force needed by the lever-and-ratchet-hybrid-load-binder 1 in FIG. 14 with the twelve (12) degrees of pivot difference may be preferential in only allowing the modified ratchet-load binder 3 to remove the tension from the binder hooks 130, 50 and not allowing the modified lever-load-binder 98 to remove the tension from the binder hooks 130,150 prior to using the modified ratchet-load binder 3. In this instance of preference, if the modified ratchet-load binder 3 only was locked out of use in the loosening rotation, there would be no reason to also lock out the use of the modified lever-load-binder 98.

FIG. 16 the same drawing at FIG. 14 with the added U-arm-centerline 108 displayed and the added straight-arm-centerline 109 displayed. Approximate twelve (12) degrees of difference 132 between the two centerlines 108, 109 is shown.

FIG. 17 the same drawing at FIG. 15 with the added U-arm-centerline 108 displayed and the added straight-arm-centerline 109 displayed. Approximate six (6) degrees of difference 133 between the two centerlines 108, 109 is shown.

FIG. 18 shown the lever-and-ratchet-hybrid-load-binder 1 in the fully open position.

FIG. 19 is a top view elevation of the lever-load-binder handle 100, straight-arm 110, lever-handle-grasp-end 102, lever-handle-base 104, straight-arm-pivot-connection-to-handle 114, lever-handle-slot 105, straight-arm-pivot-joint 118, first rotating connector 120, U-arm-pivot-joint 116, second rotating connector 122, lever-handle-pivot-point 101. U-arm-pivot-connection-to-handle 112. The lever-handle-slot 105 can be modified for various fully opening positions of the lever-and-ratchet-hybrid-load-binder 1.

The foregoing detailed description is given primarily for clearness of understanding and no unnecessary limitations are to be understood there from, for modification will become obvious to those skilled in the art upon reading this disclosure and may be made without departing from the spirit of the invention and scope of the appended claims.

The invention claimed is:

1. A ratchet-load-binder combined and attached inline to a lever-load-binder, the combination creating a lever-and-ratchet-hybrid-load-binder that utilizes quick chain slack removal properties of a lever-load-binder in combination with tight chain tension applying properties of a ratchet-load-binder, the lever-and-ratchet-hybrid-load-binder comprising:

I) a ratchet-load-binder comprising:

a) an elongated tube having opposing open ends including a first end and a second end, the first end having right-hand internal threads, and the second end having left-hand internal threads, a gear encircling the tube, the gear rigidly attached to the tube, the gear having externally facing teeth;

b) a first rod comprising right hand external threads mating to the threads in the first end of the tube, the threads starting at a first end of the first rod and extending along the first rod, a second rod comprising left hand external threads mating to the threads in the second end of the tube, the threads starting at a first end of the second rod and extending along the second rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each rod having a means for connection to another device;

c) a handle assembly comprising a shaft and a first side spaced apart from a second side, the sides rotatably mounted around the tube to rotate completely around the tube while straddling the gear, the handle assembly generally perpendicular to the tube, the handle assembly having the first side positioned on one side of the gear and the second side positioned on the opposing side of the gear, the handle assembly first and second sides encircling the tube;

d) a pivotally attached U-shaped-pawl referred herein as a U-pawl with a first tooth on one end of the U-pawl and a second tooth on the opposing end of the U-pawl, the first tooth for driving rotation of the tube in the first-rotational-direction and the second tooth for driving the rotation of the tube in the second-rotational-direction, the U-pawl teeth for engaging the gear teeth, the U-pawl attached to the handle assembly between the first side and the second side, the U-pawl pivoting on a pivot axle inserted at a pivot hole on the U-pawl, the pivot axle being attached to the handle assembly first side and the second side that straddles the gear, the pivot axle on the U-pawl being generally centered between the first tooth and the second tooth of the U-pawl, the U-pawl comprising;

i) a first-driving-position;

ii) a second-driving-position;

iii) a middle-neutral-position, and wherein either i) the middle-neutral-position is not securely held in position, or ii) the middle-neutral-position is securely held in position;

e) a means for applying flexible pressure on the U-pawl causing the U-pawl to be held securely in either the first-driving-position or the second-driving-position, the means for applying flexible pressure on the U-pawl keeping the U-pawl first tooth or the second tooth engaged with the gear teeth during ratcheting rotation of the tube, the means for applying flexible pressure on the U-pawl allowing flexible pivotal movement of the U-pawl first tooth or the second tooth around gear teeth roots and gear teeth tips for incremental back and forth movement of the handle assembly and the U-pawl during a ratcheting rotational movement of the tube, wherein moving the U-pawl from the first-driving-position to the second-driving-position or vice versa requires the U-pawl to be manually and forcefully pivoted;

II) a lever-load-binder comprising:
a) a handle with a base and a grab end;
b) a U-arm that straddles the handle and is pivotally connected to the handle;
c) a straight-arm that pivots in and out of a handle slot and is pivotally connected to the handle;
d) the U-arm comprising a pivot joint on the end opposing the U-arm handle connection;
e) a means for attachment of another device to the U-arm pivot joint;
f) the lever load binder comprising a i) closed and held position of the handle, ii) a middle neutral position of the handle, and iii) opening positions of the handle; the lever-load-binder U-arm when drawn with a U-arm-longitudinal-centerline and the lever-load-binder straight-arm when drawn with a straight-arm-longitudinal-centerline comprises a pivot degree angle difference of about twelve (12) degrees between the U-arm-centerline and the straight-arm-centerline when the lever-load-binder handle is in the closed and held position; and III) a metal welding means of attaching the straight-arm of the lever-load binder to the second end of the second rod of the ratchet binder creating a single combination device.

2. The lever-and-ratchet-hybrid-load-binder of claim 1 wherein the first rod second end means for connection to another device is releasable.

3. The lever-and-ratchet-hybrid-load-binder of claim 2 wherein the first rod second end means for connection to another device comprises an eyelet, a flexible connector, and a hook.

4. The lever-and-ratchet-hybrid-load-binder of claim 1 wherein the means for applying flexible pressure on the U-pawl comprises a spring.

5. The lever-and-ratchet-hybrid-load-binder of claim 1 wherein the means for attachment of another device to the U-arm pivot joint is releasable.

6. The lever-and-ratchet-hybrid-load-binder of claim 5 wherein the means for attachment of another device to the U-arm pivot joint comprises an eyelet, a flexible connector, and a hook.

7. A system comprising:
The lever-and-ratchet-hybrid-load-binder of claim 1;
a blocking device that prevents the U-pawl of the ratchet-load-binder from being moved in a position that would loosen a connected bound chain, while allowing the tightening of the bound chain using the ratchet-load-binder handle.

8. A ratchet-load-binder combined and attached inline to a lever-load-binder, the combination creating a lever-and-ratchet-hybrid-load-binder that utilizes quick chain slack removal properties of a lever-load-binder in combination with tight chain tension applying properties of a ratchet-load-binder, the lever-and-ratchet-hybrid-load-binder comprising:

I) a ratchet-load-binder comprising:
a) an elongated tube having opposing open ends including a first end and a second end, the first end having right-hand internal threads, and the second end having left-hand internal threads, a gear encircling the tube, the gear rigidly attached to the tube, the gear having externally facing teeth;
b) a first rod comprising right hand external threads mating to the threads in the first end of the tube, the threads starting at a first end of the first rod and extending along the first rod, a second rod comprising left hand external threads mating to the threads in the second end of the tube, the threads starting at a first end of the second rod and extending along the second rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each rod having a means for connection to another device;
c) a handle assembly comprising a shaft and a first side spaced apart from a second side, the sides rotatably mounted around the tube to rotate completely around the tube while straddling the gear, the handle assembly generally perpendicular to the tube, the handle assembly having the first side positioned on one side of the gear and the second side positioned on the opposing side of the gear, the handle assembly first and second sides encircling the tube;
d) a pivotally attached U-shaped-pawl referred herein as a U-pawl with a first tooth on one end of the U-pawl and a second tooth on the opposing end of the U-pawl, the first tooth for driving rotation of the tube in the first-rotational-direction and the second tooth for driving the rotation of the tube in the second-rotational-direction, the U-pawl teeth for engaging the gear teeth, the U-pawl attached to the handle assembly between the first side and the second side, the U-pawl pivoting on a pivot axle inserted at a pivot hole on the U-pawl, the pivot axle being attached to the handle assembly first side and the second side that straddles the gear, the pivot axle on the U-pawl being generally centered between the first tooth and the second tooth of the U-pawl, the U-pawl comprising;
i) a first-driving-position;
ii) a second-driving-position;
iii) a middle-neutral-position, and wherein either i) the middle-neutral-position is not securely held in position, or ii) the middle-neutral-position is securely held in position;
e) a means for applying flexible pressure on the U-pawl causing the U-pawl to be held securely in either the first-driving-position or the second-driving-position, the means for applying flexible pressure on the U-pawl keeping the U-pawl first tooth or the second tooth engaged with the gear teeth during ratcheting rotation of the tube, the means for applying flexible pressure on the U-pawl allowing flexible pivotal movement of the U-pawl first tooth or the second tooth around gear teeth roots and gear teeth tips for incremental back and forth movement of the handle assembly and the U-pawl during a ratcheting rotational movement of the tube, wherein moving the U-pawl from the first-driving-position to the second-driving-position or vice versa requires the U-pawl to be manually and forcefully pivoted;

f) the tube and the rods being reduced in length when compared to a conventional ratchet load binder, the reduction length of the tube being approximately two inches on each side of the tube for an approximate four inch reduction of the overall length of the tube, and each rod reduced approximately two inches in length;

II) a lever-load-binder comprising:

a) a handle with a base and a grab end;

b) a U-arm that straddles the handle and is pivotally connected to the handle;

c) a straight-arm that pivots in and out of a handle slot and is pivotally connected to the handle;

d) the U-arm comprising a pivot joint on the end opposing the U-arm handle connection;

e) a means for attachment of another device to the U-arm pivot joint;

f) the lever load binder comprising a i) closed and held position of the handle, ii) a middle neutral position of the handle, and iii) opening positions of the handle; the lever-load-binder U-arm when drawn with a U-arm-longitudinal-centerline and the lever-load-binder straight arm when drawn with a straight-arm-longitudinal-centerline comprises a pivot degree angle difference of substantially more than about six (6) degrees between the U-arm-centerline and the straight-arm-centerline when the lever-load-binder handle is in the closed and held position; and III) a metal welding means of attaching the straight-arm of the lever-load binder to the second end of the second rod of the ratchet binder creating a single combination device.

9. The lever-and-ratchet-hybrid-load-binder of claim 8 wherein the first rod second end means for connection to another device is releasable.

10. The lever-and-ratchet-hybrid-load-binder of claim 9 wherein the first rod second end means for connection to another device comprises an eyelet, a flexible connector, and a hook.

11. The lever-and-ratchet-hybrid-load-binder of claim 8 wherein the means for applying flexible pressure on the U-pawl comprises a spring.

12. The lever-and-ratchet-hybrid-load-binder of claim 8 wherein the means for attachment of another device to the U-arm pivot joint is releasable.

13. The lever-and-ratchet-hybrid-load-binder of claim 12 wherein the means for attachment of another device to the U-arm pivot joint comprises an eyelet, a flexible connector, and a hook.

14. A system comprising:

The lever-and-ratchet-hybrid-load-binder of claim 8;

a blocking device that prevents the U-pawl of the ratchet-load-binder from being moved in a position that would loosen a connected bound chain, while allowing the tightening of the bound chain using the ratchet-load-binder handle.

15. A ratchet-load-binder combined and attached inline to a lever-load-binder, the combination creating a lever-and-ratchet-hybrid-load-binder that utilizes quick chain slack removal properties of a lever-load-binder in combination with tight chain tension applying properties of a ratchet-load-binder, the lever-and-ratchet-hybrid-load-binder comprising:

I) a ratchet-load-binder comprising:

a) an elongated tube having opposing open ends including a first end and a second end, the first end having right-hand internal threads, and the second end having left-hand internal threads, a gear encircling the tube, the gear rigidly attached to the tube, the gear having externally facing teeth;

b) a first rod comprising right hand external threads mating to the threads in the first end of the tube, the threads starting at a first end of the first rod and extending along the first rod, a second rod comprising left hand external threads mating to the threads in the second end of the tube, the threads starting at a first end of the second rod and extending along the second rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each rod having a means for connection to another device;

c) a handle assembly comprising a shaft and a first side spaced apart from a second side, the sides rotatably mounted around the tube to rotate completely around the tube while straddling the gear, the handle assembly generally perpendicular to the tube, the handle assembly having the first side positioned on one side of the gear and the second side positioned on the opposing side of the gear, the handle assembly first and second sides encircling the tube;

d) a pivotally attached U-shaped-pawl referred herein as a U-pawl with a first tooth on one end of the U-pawl and a second tooth on the opposing end of the U-pawl, the first tooth for driving rotation of the tube in the first-rotational-direction and the second tooth for driving the rotation of the tube in the second-rotational-direction, the U-pawl teeth for engaging the gear teeth, the U-pawl attached to the handle assembly between the first side and the second side, the U-pawl pivoting on a pivot axle inserted at a pivot hole on the U-pawl, the pivot axle being attached to the handle assembly first side and the second side that straddles the gear, the pivot axle on the U-pawl being generally centered between the first tooth and the second tooth of the U-pawl, the U-pawl comprising;

i) a first-driving-position;

ii) a second-driving-position;

iii) a middle-neutral-position, and wherein either i) the middle-neutral-position is not securely held in position, or ii) the middle-neutral-position is securely held in position;

e) a means for applying flexible pressure on the U-pawl causing the U-pawl to be held securely in either the first-driving-position or the second-driving-position, the means for applying flexible pressure on the U-pawl keeping the U-pawl first tooth or the second tooth engaged with the gear teeth during ratcheting rotation of the tube, the means for applying flexible pressure on the U-pawl allowing flexible pivotal movement of the U-pawl first tooth or the second tooth around gear teeth roots and gear teeth tips for incremental back and forth movement of the handle assembly and the U-pawl during a ratcheting rotational movement of the tube, wherein moving the U-pawl from the first-driving-position to the second-driving-position or vice versa requires the U-pawl to be manually and forcefully pivoted;

II) a lever-load-binder comprising:

a) a handle with a base and a grab end;

b) a U-arm that straddles the handle and is pivotally connected to the handle;

c) a straight-arm that pivots in and out of a handle slot and is pivotally connected to the handle;

d) the U-arm comprising a pivot joint on the end opposing the U-arm handle connection;

e) a means for attachment of another device to the U-arm pivot joint;

f) the lever load binder comprising a i) closed and held position of the handle, ii) a middle neutral position of the handle, and iii) opening positions of the handle; and III) a metal welding means of attaching the straight-arm of the lever-load binder to the second end of the second rod of the ratchet binder creating a single combination device.

16. The lever-and-ratchet-hybrid-load-binder of claim 15 wherein the first rod second end means for connection to another device is releasable.

17. The lever-and-ratchet-hybrid-load-binder of claim 16 wherein the first rod second end means for connection to another device comprises an eyelet, a flexible connector, and a hook.

18. The lever-and-ratchet-hybrid-load-binder of claim 15 wherein the means for applying flexible pressure on the U-pawl comprises a spring.

19. The lever-and-ratchet-hybrid-load-binder of claim 15 wherein the means for attachment of another device to the U-arm pivot joint is releasable.

20. The lever-and-ratchet-hybrid-load-binder of claim 19 wherein the means for attachment of another device to the U-arm pivot joint comprises an eyelet, a flexible connector, and a hook.

21. A system comprising:

The lever-and-ratchet-hybrid-load-binder of claim 15;

a blocking device that prevents the U-pawl of the ratchet-load-binder from being moved in a position that would loosen a connected bound chain, while allowing the tightening of the bound chain using the ratchet-load-binder handle.

* * * * *